US011084523B2

(12) United States Patent
Sasaki et al.

(10) Patent No.: US 11,084,523 B2
(45) Date of Patent: Aug. 10, 2021

(54) VEHICLE-MOUNTED DEVICE ACTUATOR AND POWER STEERING DEVICE

(71) Applicant: HITACHI AUTOMOTIVE SYSTEMS, LTD., Hitachinaka (JP)

(72) Inventors: Mitsuo Sasaki, Hadano (JP); Takumi Hisazumi, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 177 days.

(21) Appl. No.: 16/333,555

(22) PCT Filed: Mar. 15, 2017

(86) PCT No.: PCT/JP2017/010431
§ 371 (c)(1),
(2) Date: Mar. 14, 2019

(87) PCT Pub. No.: WO2018/051550
PCT Pub. Date: Mar. 22, 2018

(65) Prior Publication Data
US 2020/0023887 A1  Jan. 23, 2020

(30) Foreign Application Priority Data
Sep. 15, 2016  (JP) .............................. JP2016-180300

(51) Int. Cl.
*B62D 5/04*  (2006.01)
*B62D 6/02*  (2006.01)
*B60W 50/029*  (2012.01)

(52) U.S. Cl.
CPC ........... *B62D 5/0463* (2013.01); *B62D 5/049* (2013.01); *B62D 6/02* (2013.01); *B60W 2050/0292* (2013.01)

(58) Field of Classification Search
CPC ........ B62D 5/0463; B62D 5/049; B62D 6/02; B60W 2050/0292
(Continued)

(56) References Cited

U.S. PATENT DOCUMENTS 8,421,388 B2   4/2013  Mukai
8,924,083 B2  12/2014  Yoshitake et al.
(Continued)

FOREIGN PATENT DOCUMENTS

JP    2004-256018 A    9/2004
JP    2011-078221 A    4/2011
(Continued)

*Primary Examiner* — Gertrude Arthur Jeanglaude
(74) *Attorney, Agent, or Firm* — Foley & Lardner LLP

(57) ABSTRACT

A power steering device includes a steering mechanism structured to steer a steerable wheel in accordance with steering of a steering wheel. A first sensor is structured to sense a specific state quantity of steering. A second sensor is structured to sense the specific state quantity. A first actuation part is structured to apply a steering force to the steering mechanism. A second actuation part is structured to apply a steering force to the steering mechanism. A first microprocessor is configured to receive an output signal from the first sensor, and control driving of the first actuation part based on the output signal received from the first sensor. A second microprocessor is configured to receive an output signal from the first sensor and an output signal from the second sensor, and control driving of the second actuation part based on the output signal received from the first sensor.

13 Claims, 17 Drawing Sheets

(58) Field of Classification Search
USPC .......................................................... 701/41
See application file for complete search history.

(56) References Cited

U.S. PATENT DOCUMENTS

| | | | |
|---|---|---|---|
| 9,043,089 B2 | 5/2015 | Sakai et al. | |
| 2014/0358375 A1* | 12/2014 | Sakai | B62D 5/0484 |
| | | | 701/41 |

FOREIGN PATENT DOCUMENTS

| JP | 2011148498 A | * | 4/2011 |
|---|---|---|---|
| JP | 2011-148498 A | | 8/2011 |
| JP | 2013-226943 A | | 11/2013 |
| JP | 2014-234101 A | | 12/2014 |
| JP | 2016-165174 A | | 9/2016 |

* cited by examiner

VEHICLE-MOUNTED DEVICE ACTUATOR AND POWER STEERING DEVICE

TECHNICAL FIELD

The present invention relates to a vehicle-mounted device actuator for a device mounted on a vehicle such as an automotive vehicle, and a power steering device.

BACKGROUND ART

A patent document 1 discloses a known conventional vehicle-mounted device actuator as follows.

This actuator is applied to a power steering device for applying a steering force to a steering mechanism, wherein the steering mechanism is structured to steer steerable wheels in accordance with steering of a steering wheel. The actuator includes: an electric motor; a sensor for sensing a rotation angle of the electric motor; and a microprocessor for performing a drive control of the electric motor based on an output signal of the sensor.

The electric motor includes: a stator, wherein two actuation parts are attached to an inner periphery of the stator, and wherein each actuation part includes a three-phase winding, i.e. a u-phase coil, a v-phase coil, and a w-phase coil; a magnetic rotor arranged radially inside of the stator; and a drive shaft fixed to an inner periphery of the rotor to rotate integrally with the rotor, and structured to output rotation of the rotor to the outside.

Upon receipt of the output signal of the sensor, the microprocessor controls driving of each of the two set of three-phase coils via a pre-driver and an inverter circuit, based on the output signal.

The thus-structured actuator is capable of continuing to generate a steering force by one of the three-phase windings and thereby maintain a function of applying a steering force to the steering mechanism, even when an electrical abnormality occurs in the other three-phase winding and thereby makes it difficult to generate a steering force by the other three-phase winding.

PRIOR ART DOCUMENT(S)

Patent Document(s)

Patent Document 1: JP 2011-078221 A

SUMMARY OF THE INVENTION

Problem(s) to be Solved by the Invention

In recent years, there is increasing demand for an actuator superior in capability of maintaining its function as compared to the conventional actuator described above, in order to enhance vehicle safety. For this purpose, it is conceivable to provide redundant sensors and redundant microprocessors as well as the redundant actuation parts.

However, if each of the redundant microprocessors is configured to drive a corresponding one of the actuation parts based on an output signal of a different one of the sensors, variation in output among the sensors may be reflected on outputs of the actuation parts, thereby causing variation among the outputs of the actuation parts.

The present invention is made in view of the technical problem described above, and is targeted for providing a vehicle-mounted device actuator and a power steering device capable of suppressing variation in output among actuation parts.

Means for Solving the Problem(s)

According to one aspect of the present invention, it comprises: a first sensor structured to sense a specific state quantity of vehicle operation; a second sensor structured to sense the specific state quantity; a first actuation part structured to drive a vehicle-mounted device; a second actuation part structured to drive the vehicle-mounted device; a first microprocessor configured to receive an output signal from the first sensor, and control driving of the first actuation part based on the output signal received from the first sensor; and a second microprocessor configured to receive an output signal from the first sensor and an output signal from the second sensor, and control driving of the second actuation part based on the output signal received from the first sensor.

Effect(s) of the Invention

The present invention makes it possible to suppress variation in output among the actuation parts.

MODE(S) FOR CARRYING OUT THE INVENTION

The following describes vehicle-mounted device actuators and power steering device control devices according to embodiments of the present invention with reference to the drawings.

First Embodiment

Figure 1:
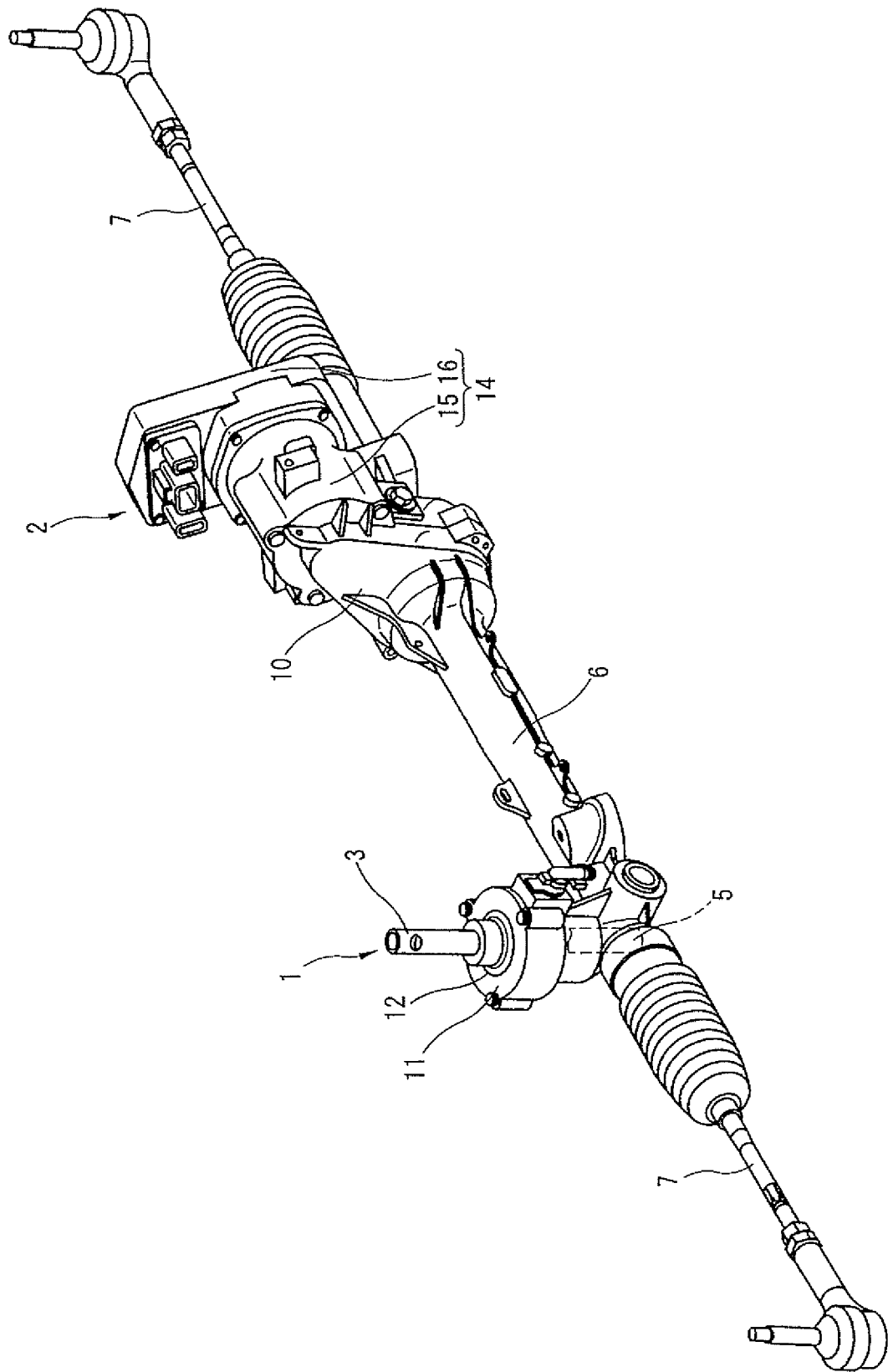
FIG. 1 is a perspective view of a power steering device according to a first embodiment of the present invention.
Figure 2:
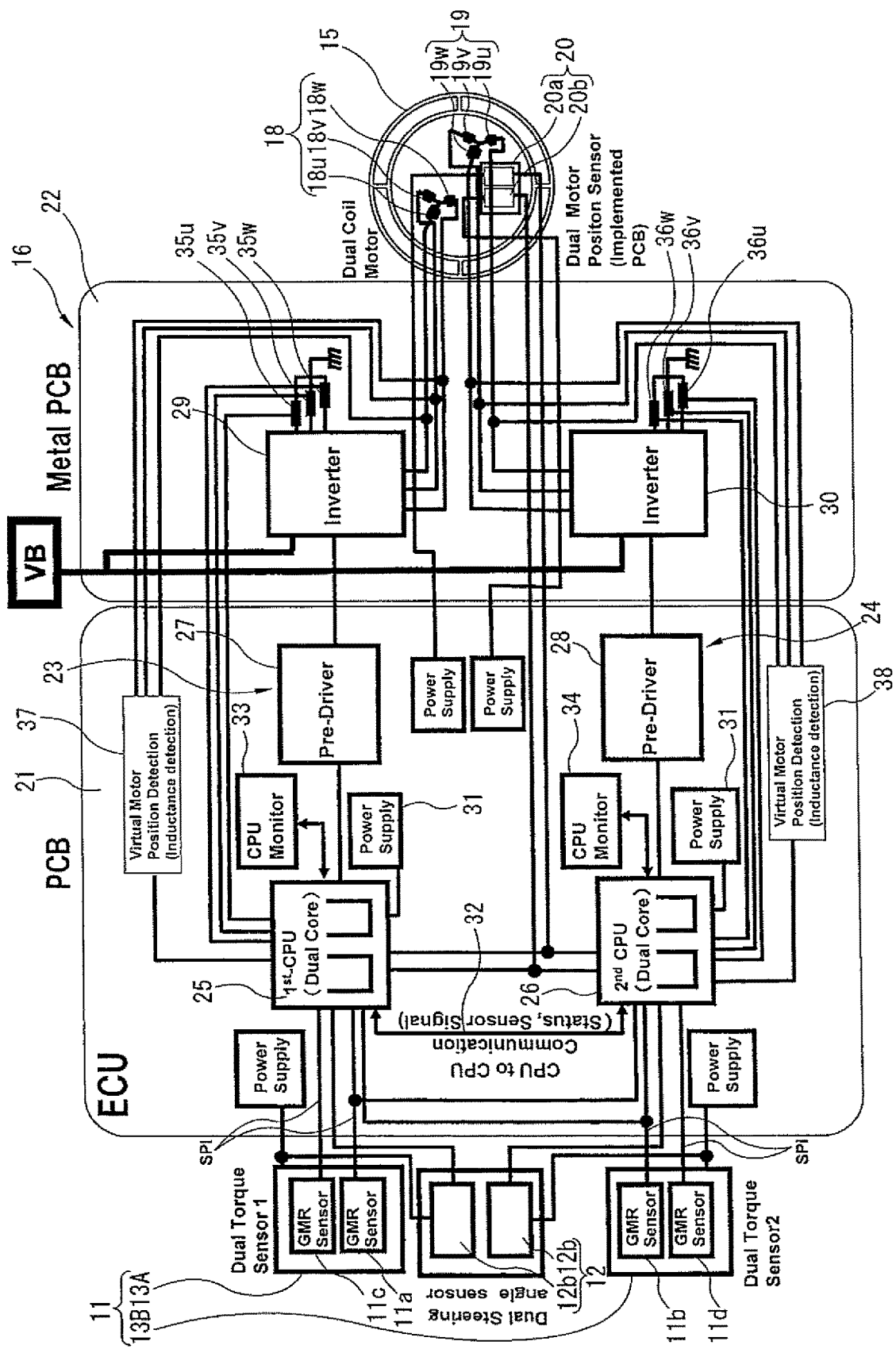
FIG. 2 is a schematic diagram showing configuration of an actuator of the power steering device.

First, the following describes basic configuration of a power steering device according to the present embodiment with reference to FIGS. 1 and 2.

As shown in FIG. 1, the power steering device includes a steering mechanism 1 and a steering assist mechanism 2, wherein steering mechanism 1 is structured to transmit rotation of a steering wheel not shown to steered wheels not shown, and wherein steering assist mechanism 2 is structured to assist steering operation of a driver by applying a steering assist force to steering mechanism 1, based on information about steering and others.

Steering mechanism 1 generally includes an input shaft 3, an output shaft 5, and a rack shaft 6, wherein input shaft 3 includes a first end side linked to the steering wheel in a manner to rotate integrally with the steering wheel, wherein output shaft 5 includes a first end side coupled to input shaft 3 via a torsion bar not shown, and wherein rack shaft 6 includes an outer periphery formed with rack teeth meshed with pinion teeth of output shaft 5, and is structured to travel in a vehicle lateral direction, namely, in an axial direction of rack shaft 6. Rack shaft 6 includes end portions linked to the steered wheels via tie rods 7, 7, knuckle arms not shown, etc., respectively, and is structured to change orientation of each steered wheel by pulling the corresponding knuckle arm by axial movement of rack shaft 6, in response to driver's steering operation of the steering wheel.

Steering assist mechanism 2 includes an actuator and a speed reduction mechanism 10, wherein the actuator has a so-called mechatronical integration structure and is configured to generate a steering assist force in accordance with a state of operation of a vehicle, and wherein speed reduction mechanism 10 is structured to transfer the steering assist force to rack shaft 6 with speed reduction.

The actuator generally includes a motor unit 14 and various sensors for sensing a specific state quantity of vehicle operation, wherein the sensors include a torque sensor 11 and a steering angle sensor 12. Torque sensor 11 is structured to sense a steering torque caused in steering mechanism 1 by driver's steering operation. Steering angle sensor 12 is structured to sense a steering angle that is an amount of rotation of the steering wheel from its neutral position. Motor unit 14 is structured to output a steering assist force based on a result of sensing of the sensors and others.

As shown in FIG. 1, torque sensor 11 and steering angle sensor 12 are arranged in a housing as well as input shaft 3, the torsion bar, and output shaft 5.

As shown in FIG. 2, torque sensor 11 has a quad-redundant system including four sensors, namely, first to fourth sensors 11a-11d. Each sensor 11a-11d includes a giant magneto resistive effect (GMR) element not shown inside, and is structured to sense a steering torque as a state quantity of vehicle operation, based on a difference in rotation angle between input shaft 3 and output shaft 5 which is allowed by torsion of the torsion bar and acquired by the GMR element. Of first to fourth sensors 11a-11d, first and third sensors 11a, 11c are unitized to form a first torque sensor unit 13A, whereas second and fourth sensors 11b, 11d are unitized to form a second torque sensor unit 13B.

On the other hand, steering angle sensor 12 has a dual-redundant system including a main sensor 12a and an auxiliary sensor 12b. Each sensor 12a, 12b is structured to sense the steering angle based on an amount of rotation of input shaft 3.

Motor unit 14 is composed integrally of an electric motor 15 and a control device 16, wherein electric motor 15 is structured to apply a steering assist force to rack shaft 6 via speed reduction mechanism 10, and wherein control device 16 is configured to control driving of electric motor 15 based on a result of sensing of the various sensors.

Electric motor 15 is a three-phase induction motor structured to be driven by a three-phase alternating current. Electric motor 15 includes a motor housing 17, a stator not shown, a magnetic rotor not shown, and a drive shaft not shown, wherein motor housing 17 has a substantially cylindrical shape, wherein the stator has a substantially cylindrical shape and is fixed to an inner peripheral surface of motor housing 17 by press fitting or the like, wherein the rotor has a substantially cylindrical shape and is arranged radially inside of the stator, and wherein the drive shaft is fixed to an inner periphery of the rotor in a manner to rotate integrally with the rotor, and is structured to output rotation of the rotor to the outside.

The stator includes a plurality of projections not shown at its inner periphery, wherein the projections are substantially evenly spaced in a circumferential direction, and extend radially. The projections are provided with a first u-phase coil 18u, a first v-phase coil 18v, a first w-phase coil 18w, a second u-phase coil 19u, a second v-phase coil 19v, and a second w-phase coil 19w shown in FIG. 2, which are wound around corresponding ones of the projections.

Specifically, the stator includes a first three-phase winding 18 as a first actuation part and a second three-phase winding 19 as a second actuation part, wherein first three-phase winding 18 is composed of first u, v, w-phase coils 18u, 18v, 18w, and wherein second three-phase winding 19 is composed of second u, v, w-phase coils 19u, 19v, 19w. The rotor and drive shaft are driven by these two systems, namely, first and second three-phase windings 18, 19.

Electric motor 15 is provided with a motor rotation angle sensor 20 structured to sense a motor rotation angle that is a rotation angle of the rotor. Motor rotation angle sensor 20 has a dual-redundant system including a main sensor 20a and an auxiliary sensor 20b. Each sensor 20a, 20b is structured to sense the motor rotation angle individually.

Control device 16 includes a resin substrate 21 and a metal substrate 22, wherein a first control section 23 and a second control section 24 are provided to extend over substrates 21, 22. Resin substrate 21 is made of non-conductive resin such as glass epoxy resin. Metal substrate 22 is made of metal such as aluminum. First control section 23 is employed to control driving of first three-phase winding 18. Second control section 24 is employed to control driving of second three-phase winding 19. When the power steering device is functioning normally, control device 16 then controls driving of electric motor 15 by output of first control section 23 for about 50% of a requested steering assist force and output of second control section 24 for about 50% of the requested steering assist force.

First and second control sections 23, 24 are placed on resin substrate 21, and respectively include first and second microprocessors 25, 26, first and second pre-drivers 27, 28, and first and second inverter circuits 29, 30. Each of first and second microprocessors 25, 26 is configured to be started up by supply of electric power from a power supply circuit 31 on resin substrate 21, and perform various calculation operations. Each of first and second pre-drivers 27, 28 is an integrated circuit (IC) placed also on resin substrate 21 and configured to receive input of a command signal from a corresponding one of first and second microprocessors 25, 26. Each of first and second inverter circuits 29, 30 is driven and controlled by a corresponding one of first and second pre-drivers 27, 28.

Each microprocessor 25, 26 is connected electrically to main and auxiliary sensors 12a, 12b of steering angle sensor 12, and is configured to receive a main steering angle signal θs(Main) from main sensor 12a and an auxiliary steering angle signal θs(Sub) from auxiliary sensor 12b, which are signals indicative of the steering angle, and is also connected electrically to main and auxiliary sensors 20a, 20b of motor rotation angle sensor 20, and is configured to receive a main motor rotation angle signal θm(Main) from main sensor 20a and an auxiliary motor rotation angle signal θm(Sub) from auxiliary sensor 20b, which are signals indicative of the motor rotation angle.

First microprocessor 25 is connected electrically to first to third sensors 11a-11c of torque sensor 11 via signal lines, and configured to receive first to third steering torque signals Tr1-Tr3 outputted from first to third sensors 11a-11c, which are signals indicative of the steering torque.

On the other hand, second microprocessor 26 is connected electrically to first, second, and fourth sensors 11a, 11b, 11d of torque sensor 11 via signal lines, and configured to receive first, second, and fourth steering torque signals Tr1, Tr2, Tr4 outputted from first, second, and fourth sensors 11a, 11b, 11d, which are signals indicative of the steering torque.

Communication between each sensor 11a-11d and each of first and second microprocessors 25, 26 is implemented by SPI (Serial Peripheral Interface) communication.

First steering torque signal Tr1, which is inputted into first and second microprocessors 25, 26, is outputted via one of a plurality of output ports not shown of first sensor 11a, and is branched into parallel signals by a conductive pattern not shown on resin substrate 21, and the parallel signals are transmitted to first and second microprocessors 25, 26 respectively.

Namely, both of first steering torque signal Tr1 outputted from first sensor 11a to first microprocessor 25 and first steering torque signal Tr1 outputted from first sensor 11a to second microprocessor 26 are outputted via the same output port of first sensor 11a.

Similarly, second steering torque signal Tr2, which is inputted into first and second microprocessors 25, 26, is outputted via one of a plurality of output ports not shown of second sensor 11b, and is branched into parallel signals by a conductive pattern not shown on resin substrate 21, and the parallel signals are transmitted to first and second microprocessors 25, 26 respectively.

Figure 3:
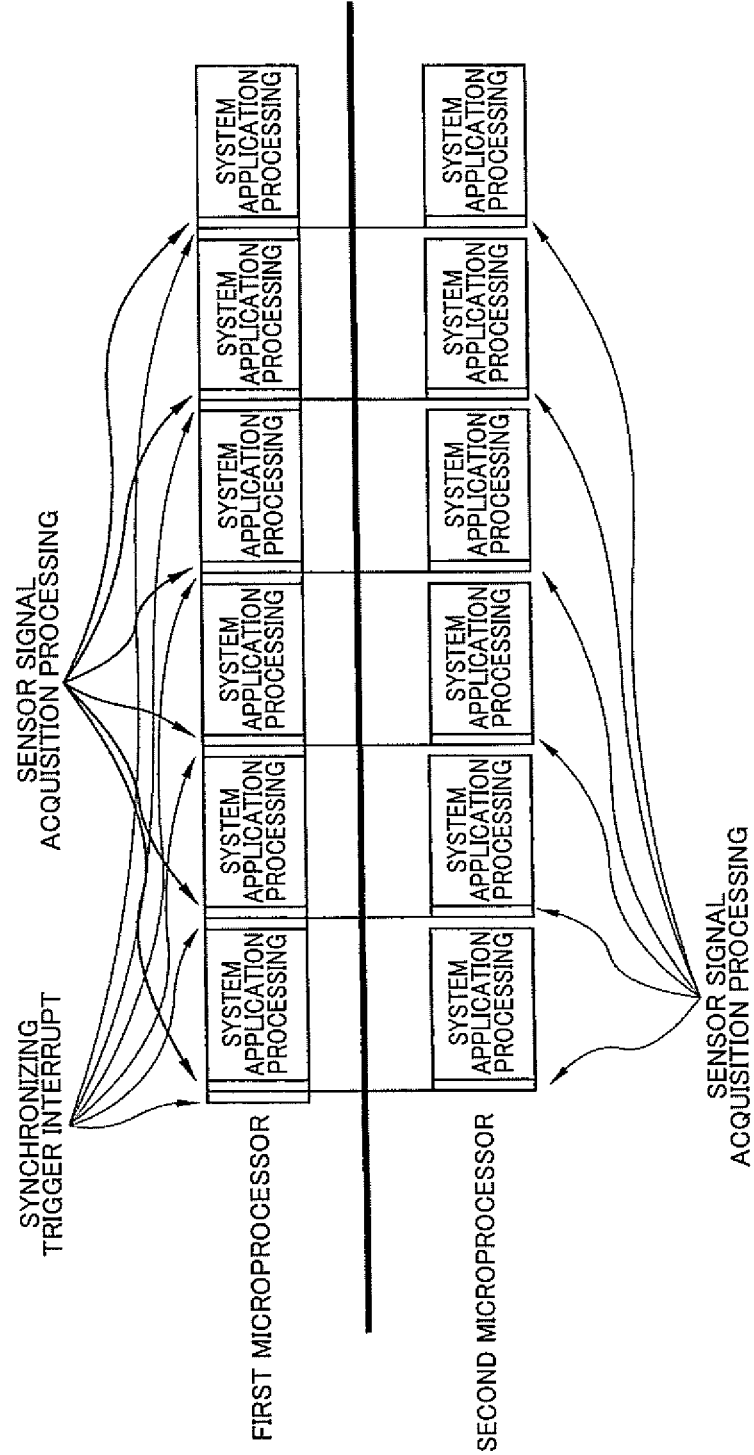
FIG. 3 is a diagram showing how first and second microprocessors are synchronized with each other.

Each of first and second microprocessors 25, 26 has a self-diagnosis function to diagnose whether or not the each of first and second microprocessors 25, 26 is abnormal, where an inter-processor communication part 32 is provided between first and second microprocessors 25, 26 for electrical connection therebetween. Each microprocessor 25, 26 is configured to: communicate information required for various controls to each other via inter-processor communication part 32; and when acquiring output signals of the sensors and performing various controls based on the acquired signals, first perform the self-diagnosis function, and thereafter cause a synchronizing trigger signal to be outputted from first microprocessor 25 to second microprocessor 26 via inter-processor communication part 32, and thereby perform acquisition of the output signals and various controls under condition that first and second microprocessors 25, 26 are synchronized together, as shown in FIG. 3.

Furthermore, first and second microprocessors 25, 26 are respectively provided with first and second MPU monitors 33, 34 configured to monitor states of operation of first and second microprocessors 25, 26. Each MPU monitor 33, 34 is configured to shut off power supply to the corresponding microprocessor 25, 26, when the corresponding microprocessor 25, 26 to be monitored is identified as being abnormal.

Each of first and second inverter circuits 29, 30 is composed of switching elements not shown such as MOS-FETs, and when receiving a command signal from the corresponding pre-driver 27, 28, then converts an electric current, which is supplied from a battery VB in accordance with the command signal, from direct current form into three-phase alternating current form, and supplies the electric current to the corresponding three-phase winding 18, 19.

Electric currents downstream of first inverter circuit 29 are sensed by first current sensors 35u, 35v, 35w, and fed back to first microprocessor 25, whereas electric currents downstream of second inverter circuit 30 are sensed by second current sensors 36u, 36v, 36w, and fed back to second microprocessor 26.

Resin substrate 21 is provided with a first virtual motor rotation angle sensor 37 and a second virtual motor rotation angle sensor 38 thereon, wherein first virtual motor rotation angle sensor 37 is configured to sense a virtual motor rotation angle of electric motor 15 derived from an electric current supplied to first three-phase winding 18 and others, and wherein second virtual motor rotation angle sensor 38 is configured to sense a virtual motor rotation angle of electric motor 15 derived from an electric current supplied to second three-phase winding 19 and others.

First virtual motor rotation angle sensor 37 is connected electrically to first microprocessor 25, and configured to output a first virtual motor rotation angle signal θv1 to first microprocessor 25, wherein first virtual motor rotation angle signal θv1 is a signal indicative of a sensed virtual motor rotation angle.

Second virtual motor rotation angle sensor 38 is connected electrically to second microprocessor 26, and configured to output a second virtual motor rotation angle signal θv2 to second microprocessor 26, wherein second virtual motor rotation angle signal θv2 is a signal indicative of a sensed virtual motor rotation angle.

Figure 4:
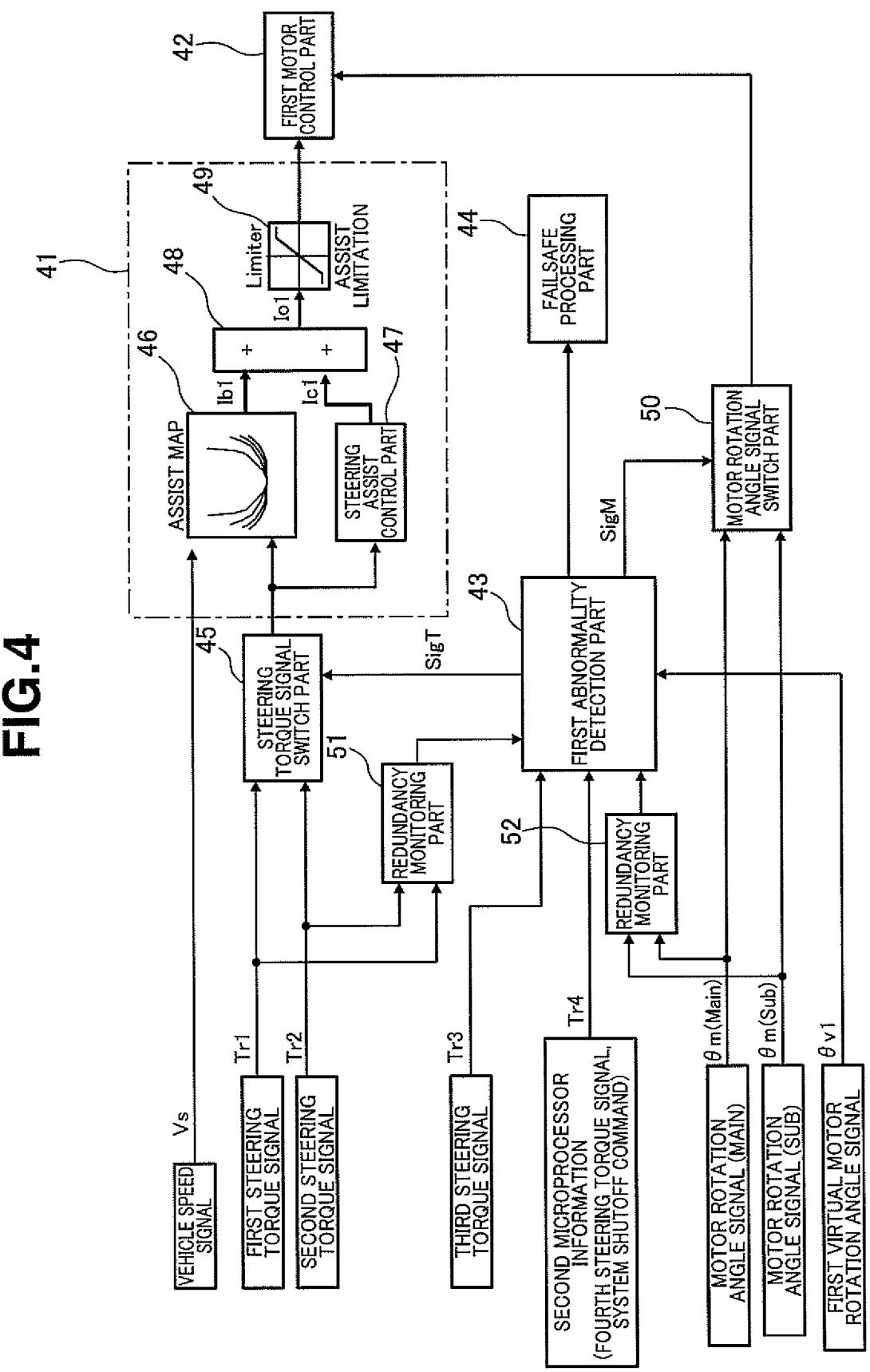
FIG. 4 is a control block diagram showing a configuration of processing of the first microprocessor.
Figure 5:
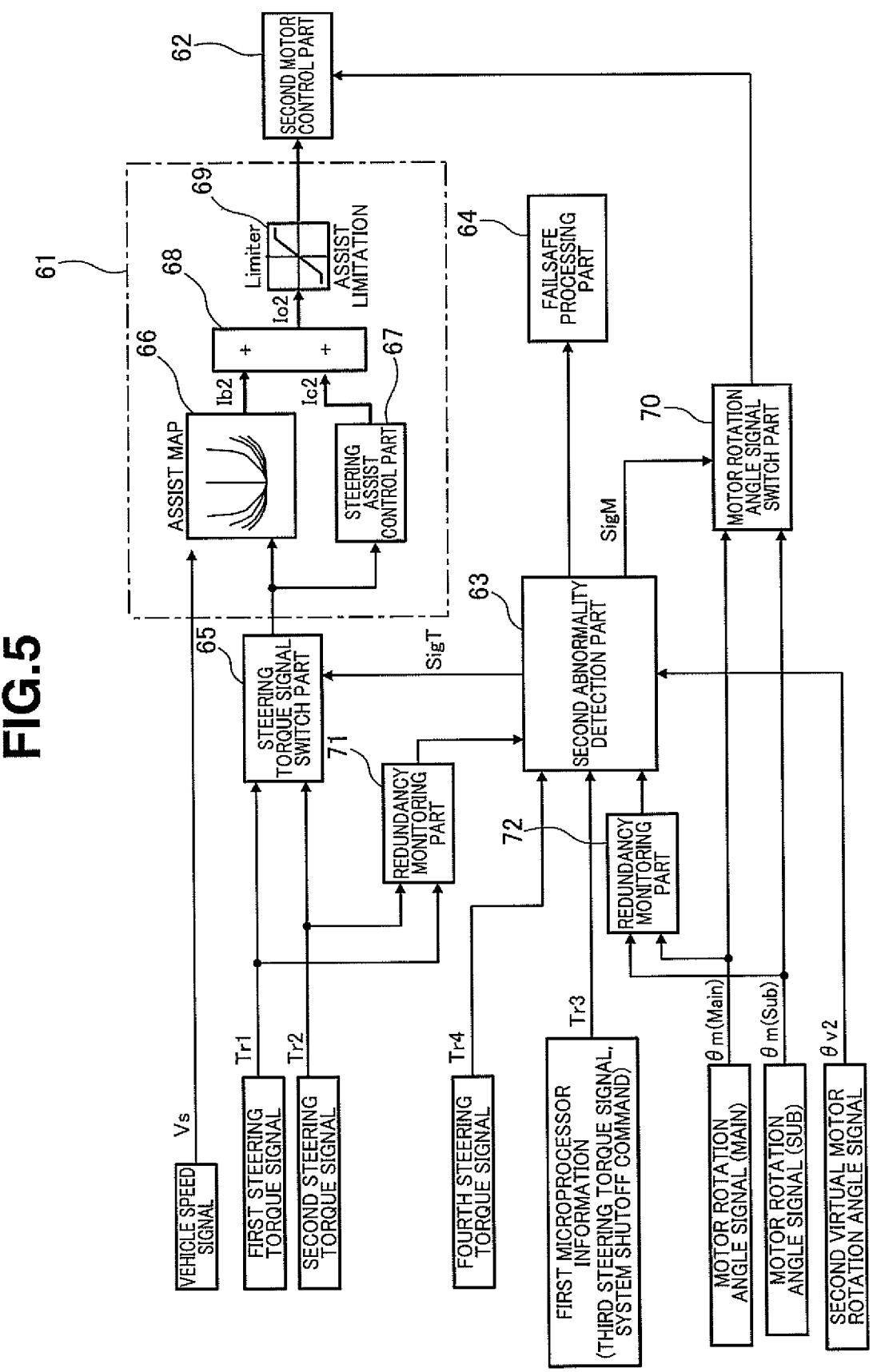
FIG. 5 is a control block diagram showing a configuration of processing of the second microprocessor.

The following details control operations of first and second microprocessors 25, 26 with reference to control block diagrams shown in FIGS. 4 and 5.

As shown in FIG. 4, first microprocessor 25 includes a first command signal calculation part 41, a first motor control part 42, a first abnormality detection part 43, and a first failsafe processing part 44. First command signal calculation part 41 is configured to calculate a command signal Io1 for drive control of first three-phase winding 18 of electric motor 15. First motor control part 42 is configured to output a command voltage to first inverter circuit 29 based on command signal Io1 and others, and thereby control driving of first three-phase winding 18. First abnormality detection part 43 is configured to detect an abnormality in torque sensor 11 and motor rotation angle sensor 20. First failsafe processing part 44 is configured to perform various failsafe operations based on a result of detection of first abnormality detection part 43.

First command signal calculation part 41 calculates a basic signal Ib1 by using a prepared assist map 46, based on one of first and second steering torque signals Tr1, Tr2 selected by a torque signal switch part 45, and a vehicle speed signal Vs acquired from a vehicle speed sensor not shown. In parallel, first command signal calculation part 41 causes a steering assist control part 47 to calculate a correction signal Ic1 based on the selected torque signal, and causes an adder 48 to calculate a command signal Io1 by adding correction signal Ic1 to basic signal Ib1.

First command signal calculation part 41 further includes a limiter processing part 49 configured to control an upper limit value of command signal Io1 variably. For example, limiter processing part 49 is configured to set the upper limit value of command signal Io1 lower under a condition where electric motor 15 is over-heated or the like than under a normal condition.

Torque signal switch part 45 is configured to basically output first steering torque signal Tr1 of first and second steering torque signals Tr1, Tr2 to assist map 46 and steering assist control part 47. When receiving input of a switch command signal SigT from first abnormality detection part 43, torque signal switch part 45 causes second steering torque signal Tr2 to be outputted to assist map 46 and steering assist control part 47, instead of first steering torque signal Tr1.

First motor control part 42 is configured to control driving of electric motor 15, based on command signal Io1 inputted from first command signal calculation part 41 (i.e. limiter processing part 49), and one of main and auxiliary motor rotation angle signals θm(Main), θm(Sub) selected by a motor rotation angle signal switch part 50.

Motor rotation angle signal switch part 50 is configured to basically output main motor rotation angle signal θm(Main) of main and auxiliary motor rotation angle signals θm(Main), θm(Sub) to first motor control part 42. When receiving input of a switch command signal SigM from first abnormality detection part 43, motor rotation angle signal switch part 50 causes auxiliary motor rotation angle signal θm(Sub) to be outputted to first motor control part 42, instead of main motor rotation angle signal θm(Main).

First abnormality detection part 43 is configured to: acquire first and second steering torque signals Tr1, Tr2 via a redundancy monitoring part 51, which is configured to perform redundancy monitoring of first and second steering torque signals Tr1, Tr2; acquire third steering torque signal Tr3 directly from third sensor 11c; acquire fourth steering torque signal Tr4 via inter-processor communication part 32 from second microprocessor 26; and perform four patterns of redundancy comparison between selected two of first to fourth steering torque signals Tr1-Tr4. Based on results of these patterns of redundancy comparison, first abnormality detection part 43 determines whether or not an abnormality is present in first and third sensors 11a, 11c, and whether or not two or more of first to fourth sensors 11a-11d are abnormal, and whether or not first microprocessor 25 itself is abnormal. All of the acquired steering torque signals Tr1-Tr4 are sensed simultaneously, namely, synchronized together.

Specifically, first abnormality detection part 43 performs redundancy comparison between first and second steering torque signals Tr1, Tr2, and redundancy comparison between first and third steering torque signals Tr1, Tr3, and redundancy comparison between second and third steering torque signals Tr2, Tr3, and redundancy comparison between second and fourth steering torque signals Tr2, Tr4.

As shown in an upper row of Table 1 below, when a difference between first and second steering torque signals Tr1, Tr2 is greater than or equal to a predetermined value (this state is indicated by "NG" in Table 1, which indication is used also in the following tables), and a difference between first and third steering torque signals Tr1, Tr3 is greater than or equal to the predetermined value, and a difference between second and third steering torque signals Tr2, Tr3 is less than the predetermined value (this state is indicated by "OK" in Table 1, which indication is used also in the following tables), and a difference between second and fourth steering torque signals Tr2, Tr4 is less than the predetermined value, first abnormality detection part 43 then determines that only first sensor 11a is abnormal. First abnormality detection part 43 then outputs switch command signal SigT to torque signal switch part 45 and thereby causes torque signal switch part 45 to select second steering torque signal Tr2 to be outputted to assist map 46 and steering assist control part 47, and also outputs a signal indicative of occurrence of abnormality of first sensor 11a to first failsafe processing part 44. Thereafter, first abnormality detection part 43 continues to detect abnormality in second to fourth sensors 11b-11d except for first sensor 11a by majority rule or the like based on second to fourth steering torque signals Tr2-Tr4 outputted by these three sensors 11b-11d.

Furthermore, as shown in a lower row of Table 1, when the difference between first and second steering torque signals Tr1, Tr2 is less than the predetermined value, and the difference between first and third steering torque signals Tr1, Tr3 is greater than or equal to the predetermined value, and the difference between second and third steering torque signals Tr2, Tr3 is greater than or equal to the predetermined value, and the difference between second and fourth steering torque signals Tr2, Tr4 is less than the predetermined value, first abnormality detection part 43 then determines that only third sensor 11c is abnormal, and outputs a signal indicative of occurrence of abnormality of third sensor 11c to first failsafe processing part 44. Thereafter, first abnormality detection part 43 continues to detect abnormality in first, second, and fourth sensors 11a, 11b, 11d except for third sensor 11c by majority rule or the like based on first, second, and fourth steering torque signals Tr1, Tr2, Tr4 outputted by first, second, and fourth sensors 11a, 11b, 11d.

TABLE 1

| | Redundancy Comparison | | | |
| --- | --- | --- | --- | --- |
| Abnormal Sensor | Between First and Second Sensors | Between First and Third Sensors | Between Second and Third Sensors | Between Second and Fourth Sensors |
| First Sensor Abnormal | NG | NG | OK | OK |
| Third Sensor Abnormal | OK | NG | NG | OK |

When the set of four patterns of redundancy comparison generates a result other than the results shown in Table 1, first abnormality detection part 43 then determines based on the result that first to fourth sensors 11a-11d are in multiple failure, or that first microprocessor 25 itself is abnormal, as detailed below with reference to flow charts.

First abnormality detection part 43 has a further function of determining whether or not an abnormality is present in main and auxiliary sensors 20a, 20b of motor rotation angle sensor 20.

Specifically, when a redundancy monitoring part 52, which is configured to perform redundancy monitoring of main and auxiliary motor rotation angle signals θm(Main), θm(Sub), determines that a difference between main and auxiliary motor rotation angle signals θm(Main), θm(Sub) is greater than or equal to a predetermined value, first abnormality detection part 43 then acquires main and auxiliary motor rotation angle signals θm(Main), θm(Sub) and first virtual motor rotation angle signal θv1.

Then, first abnormality detection part 43 compares main motor rotation angle signal θm(Main) with first virtual motor rotation angle signal θv1, and compares auxiliary motor rotation angle signal θm(Sub) with first virtual motor rotation angle signal θv1, and based on the comparisons, determines which one of main and auxiliary sensors 20a, 20b is abnormal. When main sensor 20a is abnormal, first abnormality detection part 43 then outputs switch command signal SigM to motor rotation angle signal switch part 50.

In response to detection of the various abnormalities by first abnormality detection part 43, first failsafe processing part 44 performs various failsafe operations, such as a warning light turn-on operation to turn on a warning light provided on an instrument panel not shown of the vehicle, and a shutoff operation to shut off the steering assist control system.

On the other hand, as shown in FIG. 5, second microprocessor 26 includes a second command signal calculation part 61, a second motor control part 62, a second abnormality detection part 63, and a second failsafe processing part 64. Second command signal calculation part 61 is configured to calculate a command signal Io2 for drive control of second three-phase winding 19 of electric motor 15. Second motor control part 62 is configured to output a command voltage to second inverter circuit 30 based on command signal Io2 and others, and thereby control driving of second three-phase winding 19. Second abnormality detection part 63 is configured to detect an abnormality in torque sensor 11 and motor rotation angle sensor 20. Second failsafe processing part 64 is configured to perform various failsafe operations based on a result of detection of second abnormality detection part 63.

Second command signal calculation part 61 calculates a basic signal Ib2 by using a prepared assist map 66, based on one of first and second steering torque signals Tr1, Tr2 selected by a torque signal switch part 65, and a vehicle speed signal Vs acquired from a vehicle speed sensor not shown. In parallel, second command signal calculation part 61 causes a steering assist control part 67 to calculate a correction signal Ic2 based on the selected torque signal, and causes an adder 68 to calculate a motor command signal Io2 by adding correction signal Ic2 to basic signal Ib2.

Second command signal calculation part 61 further includes a limiter processing part 69 configured to control an upper limit value of command signal Io2 variably. For example, limiter processing part 69 is configured to set the upper limit value of command signal Io2 lower under a condition where electric motor 15 is over-heated or the like than under a normal condition.

Torque signal switch part 65 is configured to basically output first steering torque signal Tr1 of first and second steering torque signals Tr1, Tr2 to assist map 65 and steering assist control part 67. When receiving input of a switch command signal SigT from second abnormality detection part 63, torque signal switch part 65 causes second steering torque signal Tr2 to be outputted to assist map 65 and steering assist control part 67, instead of first steering torque signal Tr1.

Second motor control part 62 is configured to control driving of electric motor 15, based on command signal Io2 inputted from second command signal calculation part 61 (i.e. limiter processing part 69), and one of main and auxiliary motor rotation angle signals θm(Main), θm(Sub) selected by a motor rotation angle signal switch part 70.

Motor rotation angle signal switch part 70 is configured to basically output main motor rotation angle signal θm(Main) of main and auxiliary motor rotation angle signals θm(Main), θm(Sub) to second motor control part 62. When receiving input of a switch command signal SigM from second abnormality detection part 63, motor rotation angle signal switch part 70 causes auxiliary motor rotation angle signal θm(Sub) to be outputted to second motor control part 62, instead of main motor rotation angle signal θm(Main).

Second abnormality detection part 63 is configured to: acquire first and second steering torque signals Tr1, Tr2 via a redundancy monitoring part 71, which is configured to perform redundancy monitoring of first and second steering torque signals Tr1, Tr2; acquire third steering torque signal Tr3 via inter-processor communication part 32 from first microprocessor 25; acquire fourth steering torque signal Tr4 directly from fourth sensor 11d; and perform four patterns of redundancy comparison between selected two of first to fourth steering torque signals Tr1-Tr4. Based on results of these patterns of redundancy comparison, second abnormality detection part 63 determines whether or not an abnormality is present in second sensor 11b and fourth sensor 11d, and whether or not two or more of first to fourth sensors 11a-11d are abnormal, and whether or not second microprocessor 26 itself is abnormal. All of the acquired steering torque signals Tr1-Tr4 are sensed simultaneously, namely, synchronized together.

Specifically, second abnormality detection part 63 performs redundancy comparison between first and second steering torque signals Tr1, Tr2, and redundancy comparison between first and third steering torque signals Tr1, Tr3, and redundancy comparison between second and third steering torque signals Tr2, Tr3, and redundancy comparison between second and fourth steering torque signals Tr2, Tr4.

As shown in an upper row of Table 2 below, when a difference between first and second steering torque signals Tr1, Tr2 is greater than or equal to a predetermined value, and a difference between first and third steering torque signals Tr1, Tr3 is less than the predetermined value, and a difference between second and third steering torque signals Tr2, Tr3 is greater than or equal to the predetermined value (this state is indicated by "OK" in Table 1, which indication is used also in the following tables), and a difference between second and fourth steering torque signals Tr2, Tr4 is greater than or equal to the predetermined value, second abnormality detection part 63 then determines that only second sensor 11b is abnormal, and outputs a signal indicative of occurrence of abnormality of second sensor 11b to second failsafe processing part 64. Thereafter, second abnormality detection part 63 continues to detect abnormality in first, third, and fourth sensors 11a, 11c, 11d except for second sensor 11b by majority rule or the like based on first, third, and fourth steering torque signals Tr1, Tr3, Tr4 outputted by these three sensors 11a, 11c, 11d.

Furthermore, as shown in a lower row of Table 2, when the difference between first and second steering torque signals Tr1, Tr2 is less than the predetermined value, and the difference between first and third steering torque signals Tr1, Tr3 is less than the predetermined value, and the difference between second and third steering torque signals Tr2, Tr3 is less than the predetermined value, and the difference between second and fourth steering torque signals Tr2, Tr4 is greater than or equal to the predetermined value, second abnormality detection part 63 then determines that only fourth sensor 11d is abnormal, and outputs a signal indicative of occurrence of abnormality of fourth sensor 11d to second failsafe processing part 64. Thereafter, second abnormality detection part 63 continues to detect abnormality in first to third sensors 11a-11c except for fourth sensor 11d by majority rule or the like based on first to third steering torque signals Tr1-Tr3 outputted by first to third sensors 11a-11c.

TABLE 2

| | Redundancy Comparison | | | |
| --- | --- | --- | --- | --- |
| Abnormal Sensor | Between First and Second Sensors | Between First and Third Sensors | Between Second and Third Sensors | Between Second and Fourth Sensors |
| Second Sensor Abnormal | NG | OK | NG | NG |
| Fourth Sensor Abnormal | OK | OK | OK | NG |

When the set of four patterns of redundancy comparison generates a result other than the results shown in Table 2, second abnormality detection part 63 then determines based on the result that first to fourth sensors 11a-11d are in multiple failure, or that second microprocessor 26 itself is abnormal, as detailed below with reference to flow charts.

Second abnormality detection part 63 has a further function of determining whether or not an abnormality is present in main and auxiliary sensors 20a, 20b of motor rotation angle sensor 20.

Specifically, when a redundancy monitoring part 72, which is configured to perform redundancy monitoring of main and auxiliary motor rotation angle signals θm(Main), θm(Sub), determines that a difference between main and auxiliary motor rotation angle signals θm(Main), θm(Sub) is greater than or equal to a predetermined value, second abnormality detection part 63 then acquires main and auxiliary motor rotation angle signals θm(Main), θm(Sub) and second virtual motor rotation angle signal θv2.

Then, second abnormality detection part 63 compares main motor rotation angle signal θm(Main) with second virtual motor rotation angle signal θv2, and compares auxiliary motor rotation angle signal θm(Sub) with second virtual motor rotation angle signal θv2, and based on the comparisons, determines which one of main and auxiliary sensors 20a, 20b is abnormal. When main sensor 20a is abnormal, second abnormality detection part 63 then outputs switch command signal SigM to motor rotation angle signal switch part 70.

In response to detection of the various abnormalities by second abnormality detection part 63, second failsafe processing part 64 performs various failsafe operations, such as a warning light turn-on operation to turn on the warning light provided on the instrument panel not shown of the vehicle, and a shutoff operation to shut off the steering assist control system.

The following describes specifically an abnormality detection processing control for first to fourth sensors 11a-11d and a failsafe processing control based on a result of abnormality detection with reference to FIGS. 6-11.

Figure 6:
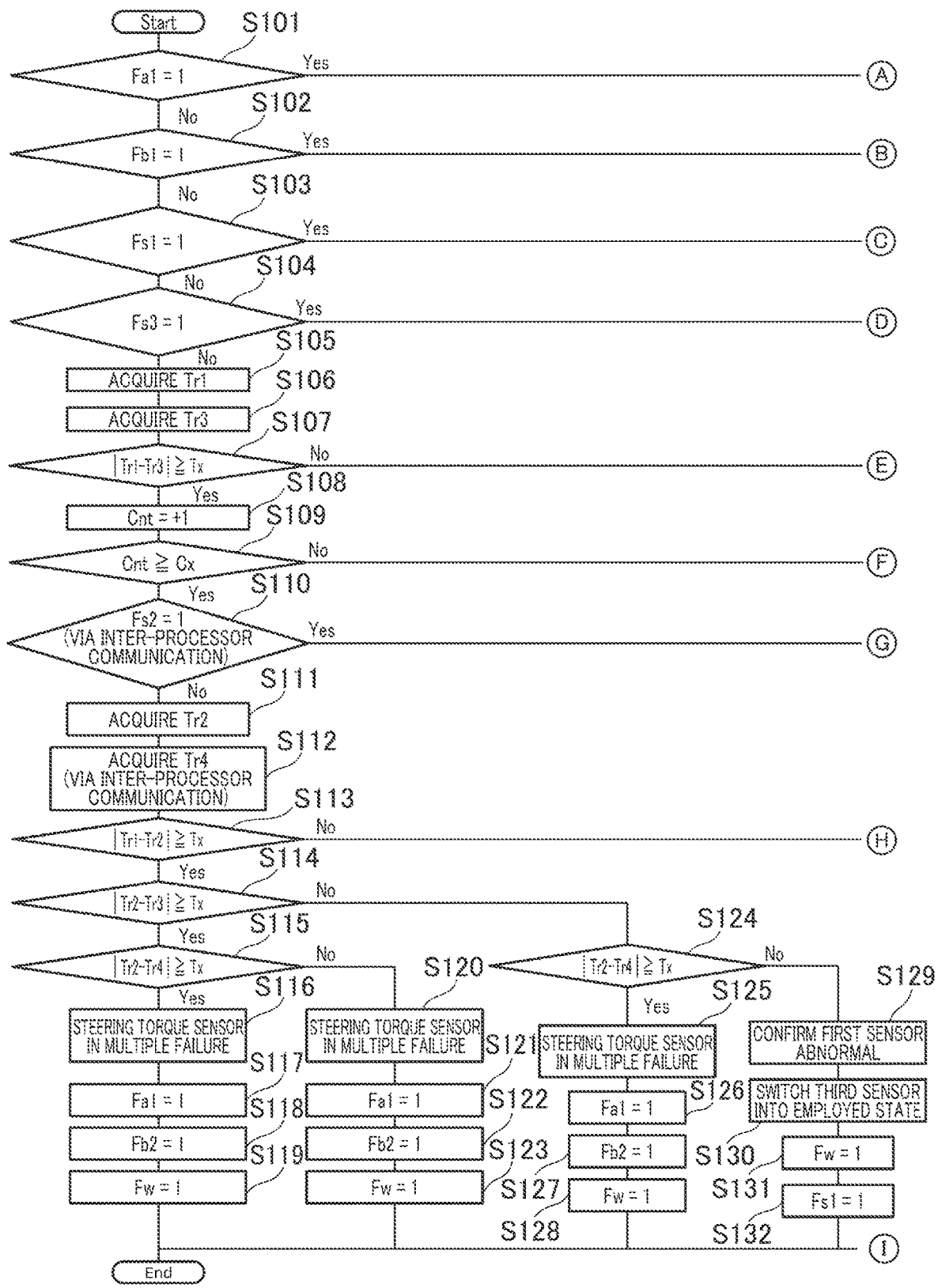
FIG. 6 is a flow chart showing a configuration of control of the first microprocessor.
Figure 7:
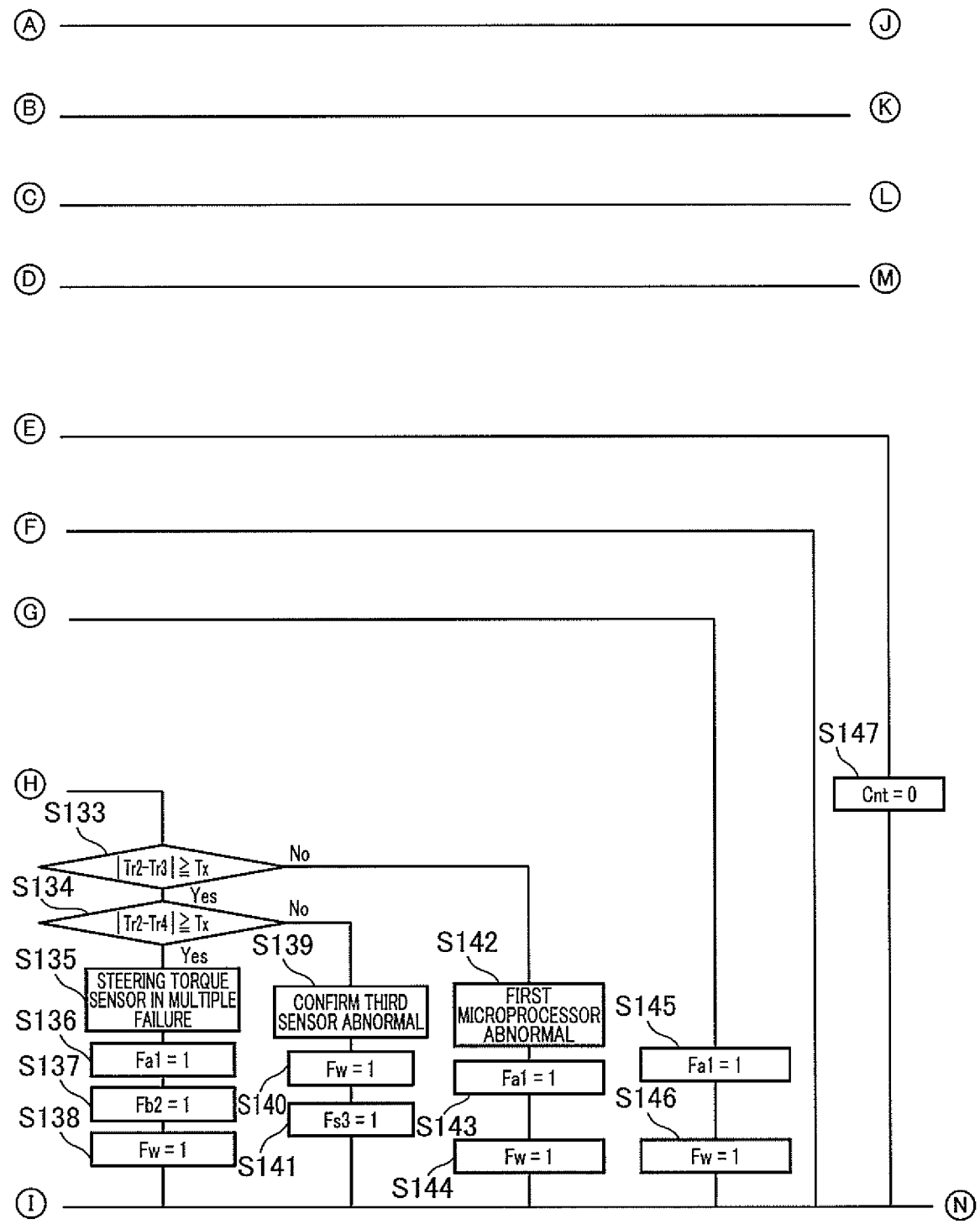
FIG. 7 is a flow chart showing a configuration of control of the first microprocessor.
Figure 8:
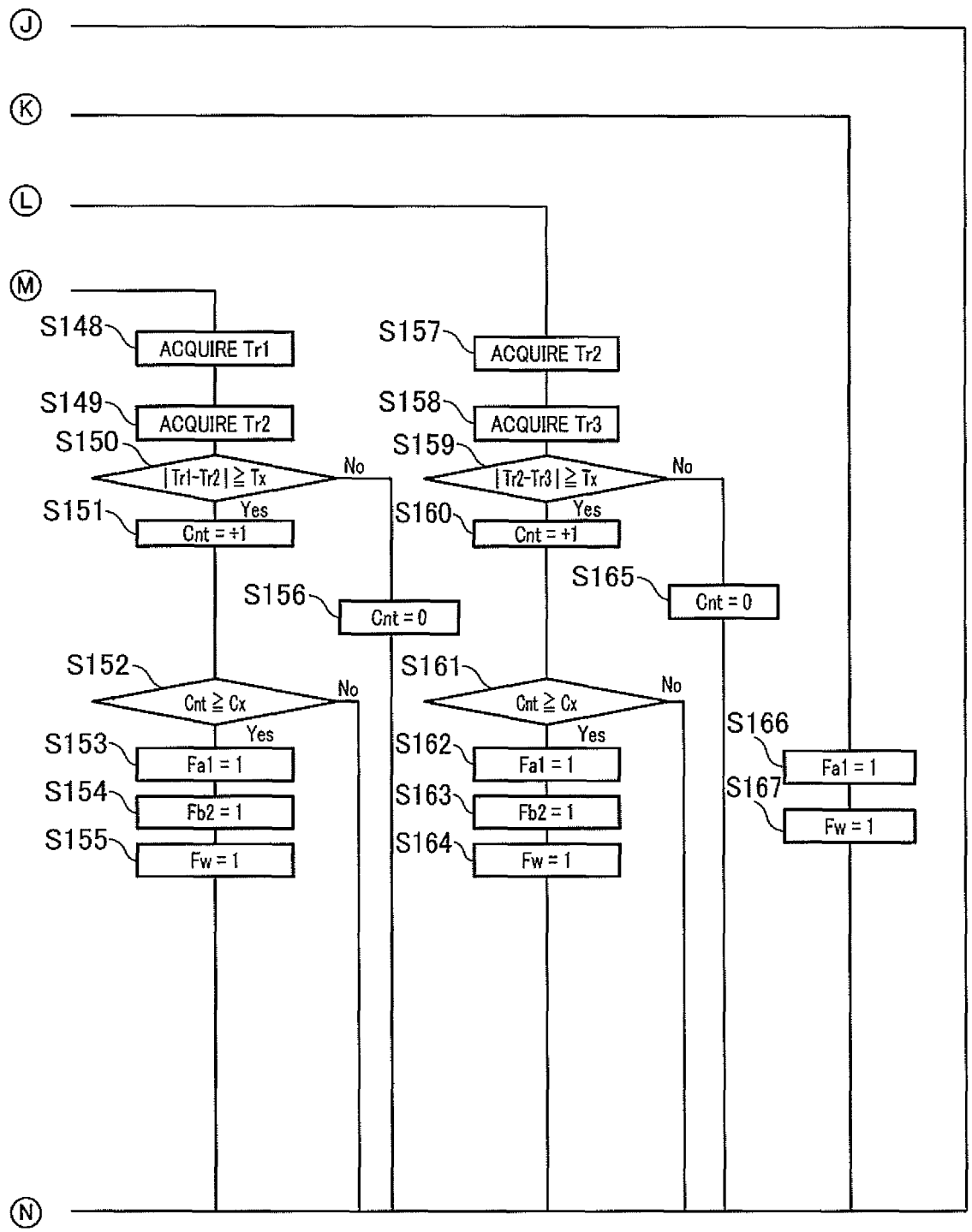
FIG. 8 is a flow chart showing a configuration of control of the first microprocessor.

FIGS. 6-8 are flow charts in series, showing an abnormality detection processing control for first and third sensors 11a, 11c and a failsafe processing control based on a result of abnormality detection, which are performed by first microprocessor 25.

First in this flow, first microprocessor 25 determines whether or not a first system shutoff flag Fa1 is set, which relates to system shutoff of first microprocessor 25 (Step S101). In case of YES at Step S101, first microprocessor 25 then terminates the present program without execution of the abnormality detection and others, under an assumption that it is difficult for the system of first microprocessor 25 to continue to work, for example, because first to fourth sensors 11a-11d are in multiple failure.

On the other hand, in case of NO at Step S101, first microprocessor 25 then determines whether or not a first system shutoff flag Fb1 is set, which is transmitted from second microprocessor 26 to first microprocessor 25 via inter-processor communication (Step S102). In case of YES at Step S102, first microprocessor 25 then assumes that a command for shutting off first microprocessor 25 is transmitted from second microprocessor 26, and therefore sets first system shutoff flag Fa1 (Step S166), and sets a warning light turn-on flag Fw (Step S167), and thereafter terminates the present program.

In case of NO at Step S102, first microprocessor 25 then determines whether or not an abnormality flag Fs1 is set, which indicates that an abnormality is detected in first sensor 11a (Step S103). In case of YES at Step S103, first microprocessor 25 then acquires second and third steering torque signals Tr2, Tr3 from second and third sensors 11b, 11c (Steps S157, S158), and thereafter determines whether or not an absolute value |Tr2-Tr3| of the difference between second and third steering torque signals Tr2, Tr3 is greater than or equal to a predetermined value Tx (Step S159).

In case of NO at Step S159, first microprocessor 25 then determines that first sensor 11a is abnormal but second and third sensors 11b, 11c are normal, and it is possible to perform the steering assist control and others based on second steering torque signal Tr2 outputted by second sensor 11b, and therefore clears an abnormality counter Cnt (Step S165), and thereafter terminates the present program.

On the other hand, in case of YES at Step S159, first microprocessor 25 then assumes that at least one of second and third sensors 11b, 11c may be abnormal, and therefore increments abnormality counter Cnt (Step S160), and thereafter proceeds to Step S161.

At Step S161, first microprocessor 25 determines whether or not abnormality counter Cnt incremented at Step S160 is greater than or equal to a predetermined value Cx. In case of NO at Step S161, first microprocessor 25 then suspends determination about abnormality of second and third sensors 11b, 11c, and terminates the present program. On the other hand, in case of YES at Step S161, first microprocessor 25 then determines that a multiple failure has occurred where at least one of second and third sensors 11b, 11c is abnormal as well as first sensor 11a, and therefore sets first system shutoff flag Fa1 (Step S162), and sets a second system shutoff flag Fb2 that is to be transmitted to second microprocessor 26 via inter-processor communication (Step S163), and thereafter sets warning light turn-on flag Fw (Step S164), and terminates the present program.

In case of NO at Step S103, first microprocessor 25 then determines whether or not an abnormality flag Fs3 for third sensor 11c is set (Step S104). In case of YES at Step S104, first microprocessor 25 then acquires first and second steering torque signals Tr1, Tr2 from first and second sensors 11a, 11b (Steps S148, S149), and thereafter determines whether or not an absolute value |Tr1-Tr2| of the difference between first and second steering torque signals Tr1, Tr2 is greater than or equal to predetermined value Tx (Step S150). Step S150 is followed by Steps S151-S156 which are similar to Steps S160-S165 described above. Herein, detailed description of Steps S151-S156 is omitted.

On the other hand, in case of NO at Step S104, first microprocessor 25 then acquires first and third steering torque signals Tr1, Tr3 from first and third sensors 11a, 11c (Steps S105, S106), and thereafter proceeds to Step S107.

At Step S107, first microprocessor 25 determines whether or not an absolute value |Tr1-Tr3| of the difference between the acquired first and third steering torque signals Tr1, Tr3 is greater than or equal to predetermined value Tx. In case of NO at Step S107, first microprocessor 25 then determines that no abnormality is present in first and third sensors 11a, 11c, and it is possible to continue the steering assist control and others based on first sensor 11a, and therefore clears abnormality counter Cnt (Step S147), and thereafter terminates the present program. On the other hand, in case of YES at Step S107, first microprocessor 25 then increments abnormality counter Cnt (Step S108), and thereafter determines whether or not abnormality counter Cnt is greater than or equal to predetermined value Cx (Step S109). In case of NO at Step S109, first microprocessor 25 then suspends abnormality detection processing until abnormality counter Cnt becomes greater than or equal to predetermined value Cx, and terminates the present program. In case of YES at Step S109, first microprocessor 25 determines that at least one of first and third sensors 11a, 11c is abnormal, and then proceeds to Step S110.

At Step S110, first microprocessor 25 determines whether or not an abnormality flag Fs2 is set, which is transmitted from second microprocessor 26 via inter-processor communication when second microprocessor 26 confirms second sensor 11b abnormal. In case of YES at Step S110, since at least one of first and third sensors 11a, 11c is identified as being abnormal, and second sensor 11b is also confirmed as being abnormal, first microprocessor 25 sets first system shutoff flag Fa1 based on determination the sensors are in multiple failure (Step S145), and sets warning light turn-on flag Fw (Step S146), and thereafter terminates the present program.

On the other hand, in case of NO at Step S110, first microprocessor 25 then acquires second steering torque signal Tr2 directly from second sensor 11b (Step S111), and acquires fourth steering torque signal Tr4 from second microprocessor 26 via inter-processor communication (Step S112), and thereafter proceeds to Step S113.

At Step S113, first microprocessor 25 determines whether or not the absolute value |Tr1-Tr2| of the difference between first and second steering torque signals Tr1, Tr2 is greater than or equal to predetermined value Tx. In case of YES at Step S113, first microprocessor 25 then proceeds to Step S114 where first microprocessor 25 determines whether or not the absolute value |Tr2-Tr3| of the difference between second and third steering torque signals Tr2, Tr3 is greater than or equal to predetermined value Tx.

In case of YES also at Step S114, first microprocessor 25 then further proceeds to Step S115 where first microprocessor 25 determines whether or not an absolute value |Tr2-Tr4| of the difference between second and fourth steering torque signals Tr2, Tr4 is greater than or equal to predetermined value Tx. At arrival at Step S115, it has been already found that at least two of first to third sensors 11a-11c are abnormal.

Therefore, when first microprocessor 25 proceeds to Step S115, both in case of YES and in case of NO at Step S115, first microprocessor 25 confirms that first to fourth sensors 11a-11d are in multiple failure (Steps S116, S120), and sets first system shutoff flag Fa1 (Steps S117, S121), and sets second system shutoff flag Fb2 that is to be transmitted to second microprocessor 26 via inter-processor communication (Steps S118, S122), and thereafter sets warning light turn-on flag Fw (Steps S119, S123), and terminates the present program.

In case of NO at Step S114, namely, when it is determined that the absolute value |Tr2-Tr3| of the difference between second and third steering torque signals Tr2, Tr3 is less than predetermined value Tx, first microprocessor 25 then proceeds to Step S124 where first microprocessor 25 determines whether or not the absolute value |Tr2-Tr4| of the difference between second and fourth steering torque signals Tr2, Tr4 is greater than or equal to predetermined value Tx.

In case of YES at Step S124, first microprocessor 25 then confirms that first to fourth sensors 11a-11d are in multiple failure (Step S125), and proceeds to Steps S126-S128 where first microprocessor 25 performs operations similar to Steps S117-S119 described above, and thereafter terminates the present program.

On the other hand, in case of NO at Step S124, first microprocessor 25 then confirms that only first sensor 11a is abnormal (Step S129), and switches the steering torque signal used in the steering assist control and others from first steering torque signal Tr1 to third steering torque signal Tr3 (Step S130). Then, first microprocessor 25 sets warning light turn-on flag Fw (Step S131), and sets abnormality flag Fs1 for first sensor 11a (Step S132), and thereafter terminates the present program.

In case of NO at Step S113, first microprocessor 25 then proceeds to Step S133 where first microprocessor 25 determines whether or not the absolute value |Tr2-Tr3| of the difference between second and third steering torque signals Tr2, Tr3 is greater than or equal to predetermined value Tx.

In case of YES at Step S133, first microprocessor 25 then proceeds to Step S134 where first microprocessor 25 determines whether or not the absolute value |Tr2-Tr4| of the difference between second and fourth steering torque signals Tr2, Tr4 is greater than or equal to predetermined value Tx.

In case of YES also at Step S134, first microprocessor 25 then confirms that first to fourth sensors 11a-11d are in multiple failure (Step S135), and proceeds to Steps S136-S138 where first microprocessor 25 operates similar to Steps S117-S119 described above, and thereafter terminates the present program.

On the other hand, in case of NO at Step S134, namely, when it is determined that the absolute value |Tr2-Tr4| of the difference between second and fourth steering torque signals Tr2, Tr4 is less than predetermined value Tx, first microprocessor 25 then confirms that only third sensor 11c is abnormal (Step S139), and sets warning light turn-on flag Fw (Step S140), and thereafter sets an abnormality flag Fs3 for third sensor 11c (Step S141), and terminates the present program.

In case of NO at Step S133, this result is normally impossible where at least one of first and third sensors 11a, 11c is identified as being abnormal at Step S109, but no abnormality is detected in first and second sensors 11a, 11b, and no abnormality is detected in second and third sensors 11b, 11c. Accordingly, first microprocessor 25 then confirms that first microprocessor 25 itself is abnormal (Step S142), and sets first system shutoff flag Fa1 (Step S143), and thereafter sets warning light turn-on flag Fw (Step S144), and terminates the present program.

Figure 9:
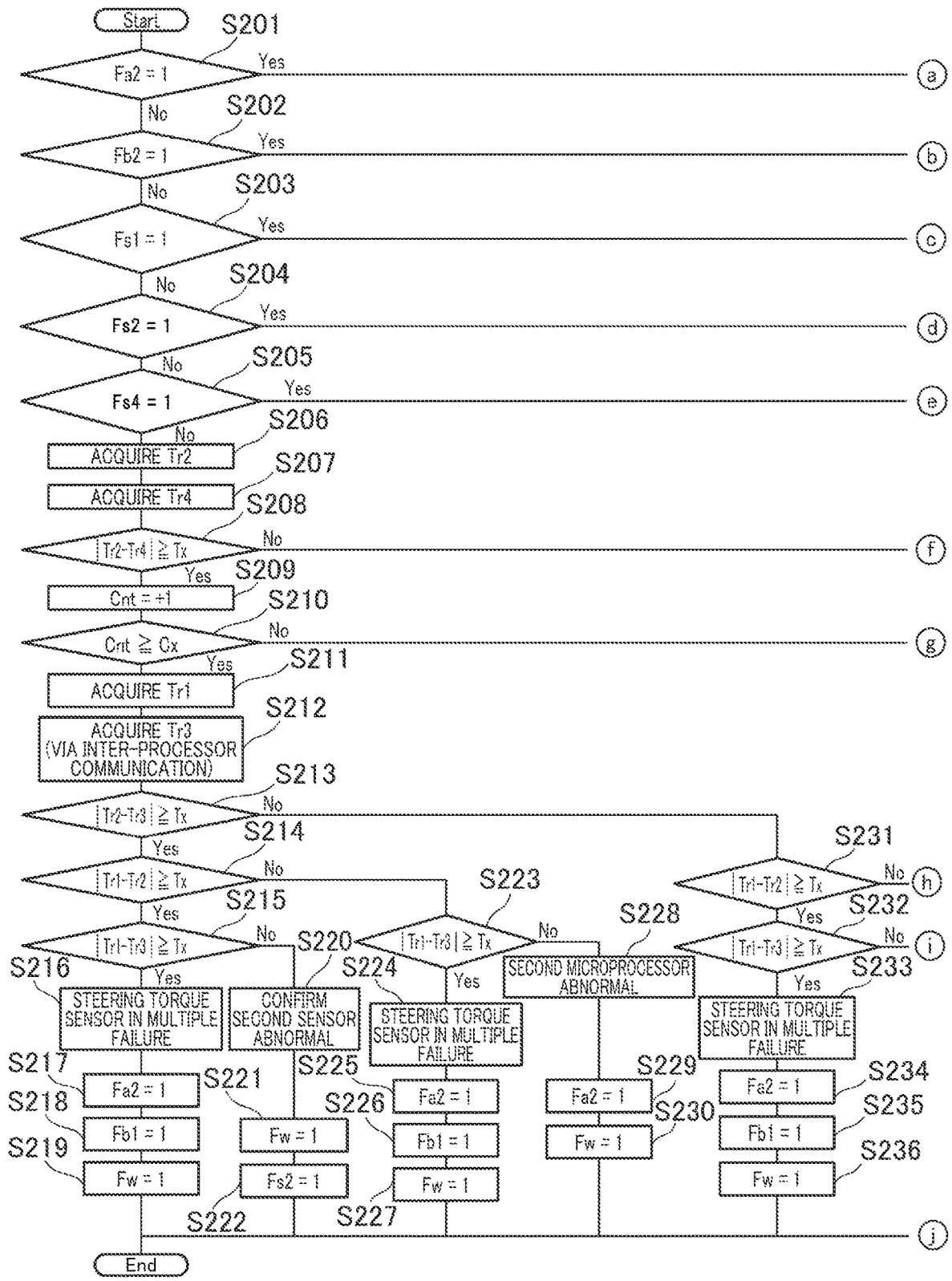
FIG. 9 is a flow chart showing a configuration of control of the second microprocessor.
Figure 10:
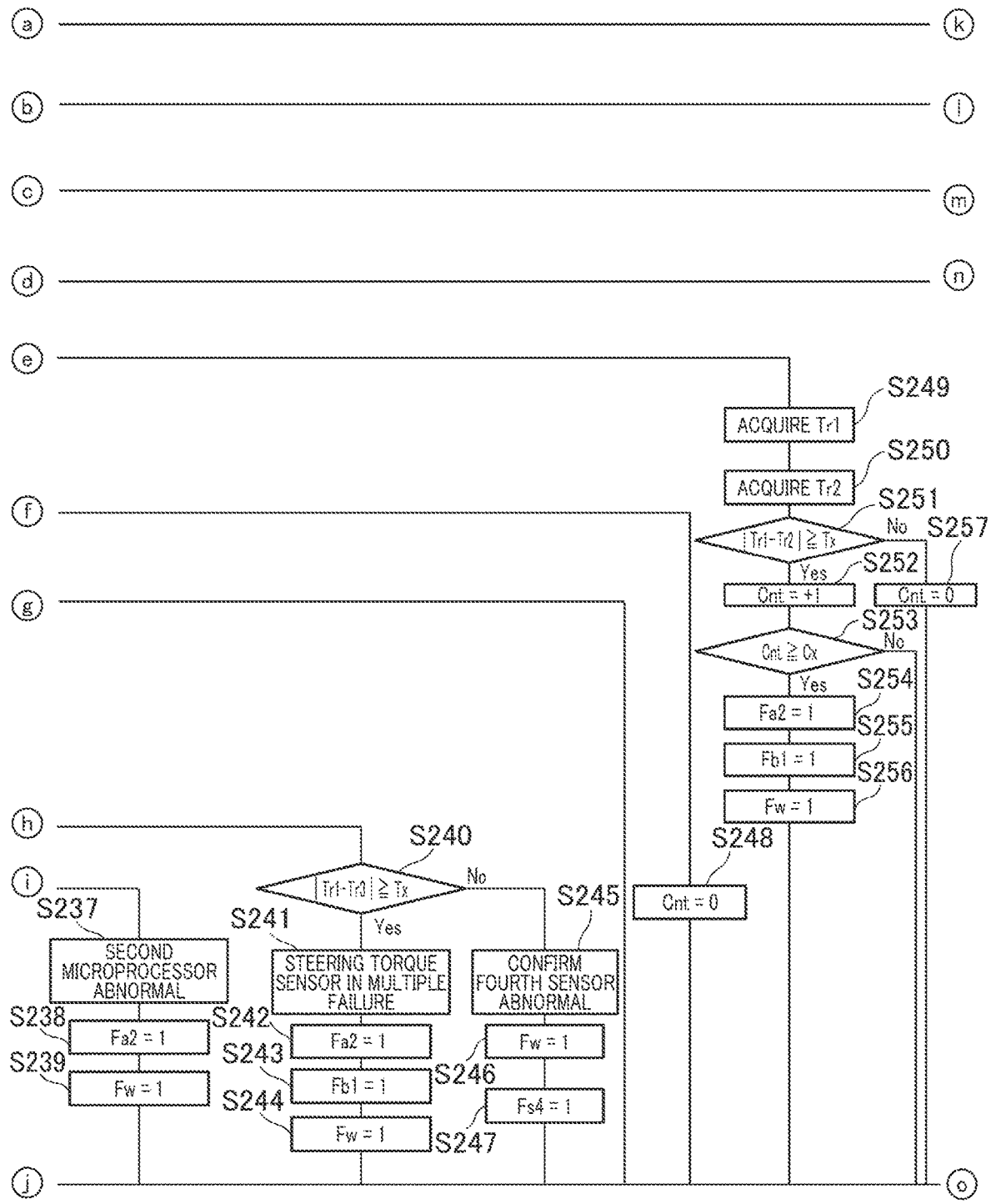
FIG. 10 is a flow chart showing a configuration of control of the second microprocessor.
Figure 11:
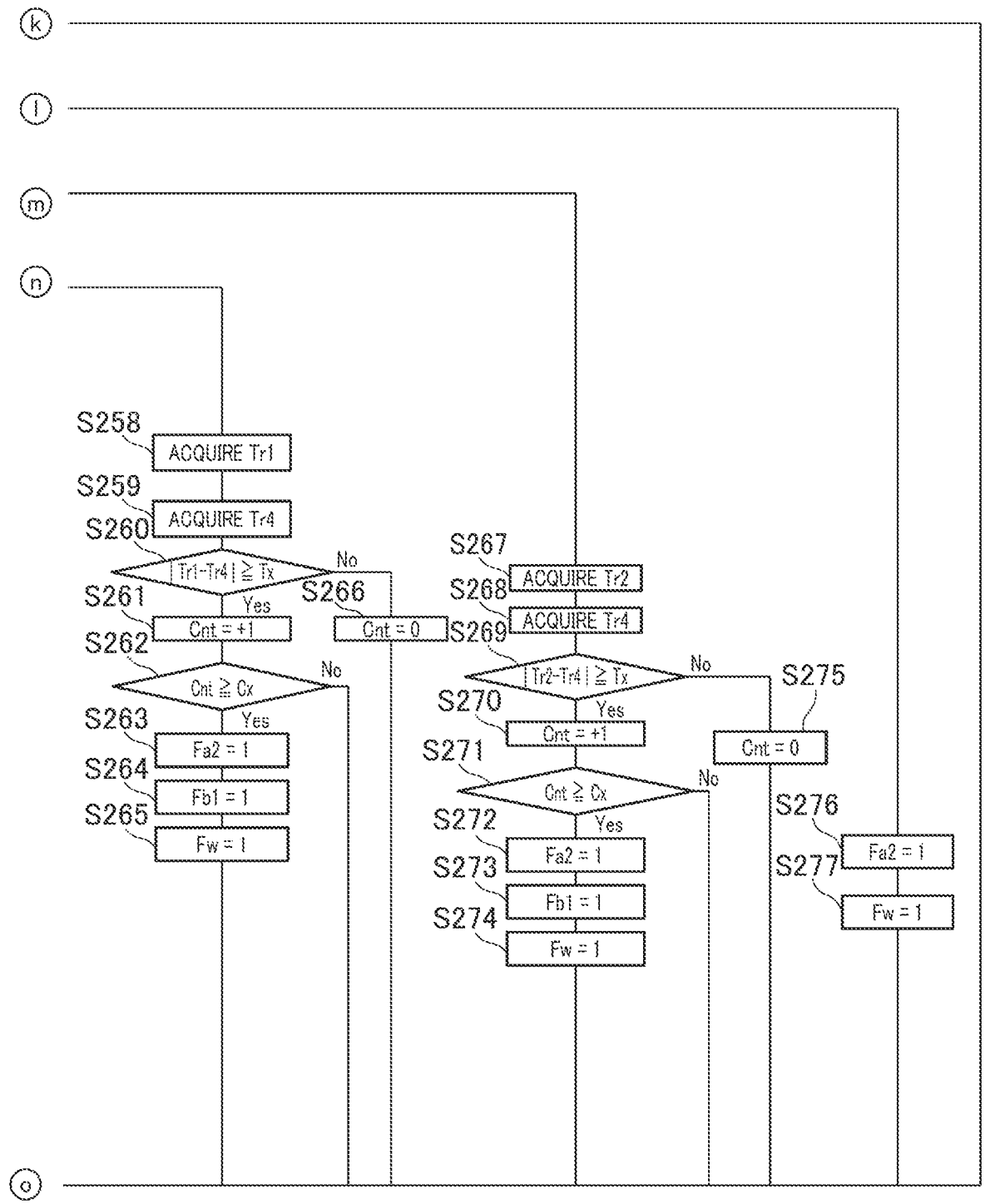
FIG. 11 is a flow chart showing a configuration of control of the second microprocessor.

FIGS. 9-11 are flow charts in series, showing an abnormality detection processing control for second and fourth sensors 11b, 11d and a failsafe processing control based on a result of abnormality detection, which are performed by second microprocessor 26.

First in this flow, second microprocessor 26 determines whether or not a second system shutoff flag Fa2 is set, which relates to system shutoff of second microprocessor 26 (Step S201). In case of YES at Step S201, second microprocessor 26 then terminates the present program without execution of the abnormality detection and others, under an assumption that it is difficult for the system of second microprocessor 26 to continue to work, for example, because first to fourth sensors 11a-11d are in multiple failure.

On the other hand, in case of NO at Step S201, second microprocessor 26 then determines whether or not second system shutoff flag Fb2 is set, which is transmitted from first microprocessor 25 to second microprocessor 26 via inter-processor communication (Step S202). In case of YES at Step S202, second microprocessor 26 then assumes that a command for shutting off second microprocessor 26 is transmitted from first microprocessor 25, and therefore sets second system shutoff flag Fa2 (Step S276), and sets a warning light turn-on flag Fw (Step S277), and thereafter terminates the present program.

In case of NO at Step S202, second microprocessor 26 then proceeds to Step S203 where second microprocessor 26 determines whether or not abnormality flag Fs1 for first sensor 11a is set, which is transmitted via inter-processor communication from first microprocessor 25 when first sensor 11a is confirmed abnormal.

In case of YES at Step S203, second microprocessor 26 then acquires second and fourth steering torque signals Tr2, Tr4 from second and fourth sensors 11b, 11d (Steps S267, S268), and thereafter determines whether or not an absolute value |Tr2-Tr4| of the difference between second and fourth steering torque signals Tr2, Tr4 is greater than or equal to a predetermined value Tx (Step S259).

In case of NO at Step S269, second microprocessor 26 then determines that first sensor 11a is abnormal but second and fourth sensors 11b, 11d are normal, and it is possible to perform the steering assist control and others based on second steering torque signal Tr2 outputted by second sensor 11b, and therefore clears an abnormality counter Cnt (Step S275), and thereafter terminates the present program.

On the other hand, in case of YES at Step S269, second microprocessor 26 then assumes that at least one of second and fourth sensors 11b, 11d may be abnormal, and therefore increments abnormality counter Cnt (Step S270), and thereafter proceeds to Step S271.

At Step S271, second microprocessor 26 determines whether or not abnormality counter Cnt incremented at Step S270 is greater than or equal to a predetermined value Cx. In case of NO at Step S271, second microprocessor 26 then suspends determination about abnormality of second and fourth sensors 11b, 11d, and terminates the present program. On the other hand, in case of YES at Step S271, second microprocessor 26 then determines that a multiple failure has occurred where at least one of second and fourth sensors 11b, 11d is abnormal as well as first sensor 11a, and therefore sets second system shutoff flag Fa2 (Step S272), and sets first system shutoff flag Fb1 that is to be transmitted to first microprocessor 25 via inter-processor communication (Step S273), and thereafter sets warning light turn-on flag Fw (Step S274), and terminates the present program.

In case of NO at Step S203, namely, when it is determined that abnormality flag Fs1 for first sensor 11a is not set, second microprocessor 26 then determines whether or not an abnormality flag Fs2 for second sensor 11b is set (Step S204).

In case of YES at Step S204, second microprocessor 26 then acquires first and fourth steering torque signals Tr1, Tr4 from first and fourth sensors 11a, 11d (Steps S258, S259), and thereafter determines whether or not an absolute value |Tr1-Tr4| of a difference between first and fourth steering torque signals Tr1, Tr4 is greater than or equal to predetermined value Tx (Step S251). Step S251 is followed by Steps S252-S257 which are similar to Steps S270-S275 described above. Herein, detailed description of Steps S251-S256 is omitted.

On the other hand, in case of NO at Step S205, second microprocessor 26 then acquires second and fourth steering torque signals Tr2, Tr4 from second and fourth sensors 11b, 11d (Steps S206, S207), and thereafter proceeds to Step S208.

At Step S208, second microprocessor 26 determines whether or not an absolute value |Tr2-Tr4| of the difference between the acquired second and fourth steering torque signals Tr2, Tr4 is greater than or equal to predetermined value Tx. In case of NO at Step S208, second microprocessor 26 then clears abnormality counter Cnt (Step S248), and thereafter terminates the present program. On the other hand, in case of YES at Step S208, second microprocessor 26 then increments abnormality counter Cnt (Step S209), and thereafter determines whether or not abnormality counter Cnt is greater than or equal to predetermined value Cx (Step S210). In case of NO at Step S210, second microprocessor 26 then suspends abnormality detection processing until abnormality counter Cnt becomes greater than or equal to predetermined value Cx, and terminates the present program. In case of YES at Step S210, second microprocessor 26 then acquires first steering torque signal Tr1 directly from first sensor 11a (Step S211), and acquires third steering torque signal Tr3 via inter-processor communication from first microprocessor 25 (Step S212), and thereafter proceeds to Step S213.

At Step S213, second microprocessor 26 determines whether or not an absolute value |Tr2-Tr3| of the difference between second and third steering torque signals Tr2, Tr3 is greater than or equal to predetermined value Tx. In case of YES at Step S213, second microprocessor 26 then proceeds to Step S214 where second microprocessor 26 determines whether or not an absolute value |Tr1-Tr2| of the difference between first and second steering torque signals Tr1, Tr2 is greater than or equal to predetermined value Tx.

In case of YES also at Step S214, second microprocessor 26 then further proceeds to Step S215 where second microprocessor 26 determines whether or not an absolute value |Tr1-Tr3| of the difference between first and third steering torque signals Tr1, Tr3 is greater than or equal to predetermined value Tx.

In case of YES also at Step S215, second microprocessor 26 then confirms that first to fourth sensors 11a-11d are in multiple failure (Steps S216), and sets second system shutoff flag Fa2 (Steps S217), and sets first system shutoff flag Fb1 that is to be transmitted to first microprocessor 25 via inter-processor communication (Steps S218), and thereafter sets warning light turn-on flag Fw (Steps S219), and terminates the present program.

On the other hand, in case of NO at Step S215, second microprocessor 26 then confirms that only second sensor 11b is abnormal (Step S220), and sets warning light turn-on flag Fw (Step S221), and thereafter sets abnormality flag Fs2 for second sensor 11b (Step S222), and thereafter terminates the present program.

In case of NO at Step S214, second microprocessor 26 then proceeds to Step S223 where second microprocessor 26 determines whether or not the absolute value |Tr1-Tr3| of the difference between first and third steering torque signals Tr1, Tr3 is greater than or equal to predetermined value Tx.

In case of YES at Step S223, second microprocessor 26 then confirms that first to fourth sensors 11a-11d are in multiple failure (Steps S224), and proceeds to Steps S225-S2227 where second microprocessor 26 operates similar to Steps S217-S219 described above, and thereafter terminates the present program.

On the other hand, in case of NO at Step S223, this result is normally impossible where at least one of second and third sensors 11b, 11c is identified as being abnormal at Step S213, but no abnormality is detected in first and second sensors 11a, 11b, and no abnormality is detected in first and third sensors 11a, 11c. Accordingly, second microprocessor 26 then confirms that second microprocessor 26 itself is abnormal (Step S228), and sets second system shutoff flag Fa2 (Step S229), and thereafter sets warning light turn-on flag Fw (Step S230), and terminates the present program.

In case of NO at Step S213, second microprocessor 26 then proceeds to Step S231 where second microprocessor 26 determines whether or not the absolute value |Tr1-Tr2| of the difference between first and second steering torque signals Tr1, Tr2 is greater than or equal to predetermined value Tx.

In case of YES at Step S231, second microprocessor 26 then proceeds to Step S232 where second microprocessor 26 determines whether or not the absolute value |Tr1-Tr3| of the difference between first and third steering torque signals Tr1, Tr3 is greater than or equal to predetermined value Tx.

In case of YES also at Step S232, second microprocessor 26 then confirms that first to fourth sensors 11a-11d are in multiple failure (Step S233), and proceeds to Steps S234-S236 where second microprocessor 26 operates similar to Steps S217-S219 described above, and thereafter terminates the present program.

On the other hand, in case of NO at Step S232, this result is normally impossible where at least one of first and second sensors 11a, 11b is identified as being abnormal at Step S213, but no abnormality is detected in first and third sensors 11a, 11c, and no abnormality is detected in second and third sensors 11b, 11c. Accordingly, second microprocessor 26 then confirms that second microprocessor 26 itself is abnormal (Step S237), and sets second system shutoff flag Fa2 (Step S238), and thereafter sets warning light turn-on flag Fw (Step S239), and terminates the present program.

In case of NO at Step S231, second microprocessor 26 then proceeds to Step S240 where second microprocessor 26 determines whether or not the absolute value |Tr1-Tr3| of the difference between first and third steering torque signals Tr1, Tr3 is greater than or equal to predetermined value Tx.

In case of YES at Step S240, second microprocessor 26 then confirms that first to fourth sensors 11a-11d are in multiple failure (Step S241), and proceeds to Steps S242-S244 where second microprocessor 26 operates similar to Steps S217-S219 described above, and thereafter terminates the present program.

On the other hand, in case of NO at Step S240, second microprocessor 26 then confirms that only fourth sensor 11d is abnormal (Step S245), and sets warning light turn-on flag Fw (Step S246), and thereafter sets abnormality flag Fs4 for fourth sensor 11d (Step S222), and terminates the present program.

Actions and Effects of First Embodiment

According to the thus-configured power steering device, the feature that torque sensor 11, microprocessor 25, 26, and three-phase winding 18, 19 are configured to be redundant, serves to continue the steering assist control without immediate loss of the steering assist function, even when an abnormality such as a breakdown occurs in first sensor 11a as a component of torque sensor 11, first microprocessor 25, first three-phase winding 18, etc. This serves to ensure a higher capability of maintaining its function as compared to conventional actuators, and thereby enhance usability of the device.

Furthermore, according to the present embodiment, when first sensor 11a is normal, both of first and second microprocessors 25, 26 control driving of first and second three-phase windings 18, 19 based on first steering torque signals Tr1 received from first sensor 11a.

This feature serves to suppress effects of variation among the outputs of the sensors on outputs of first and second three-phase windings 18, 19, and thereby suppress variation between the outputs of first and second three-phase windings 18, 19, as compared to a configuration that first and second microprocessors 25, 26 control first and second three-phase windings 18, 19 based on different output signals of torque sensor 11 (first steering torque signal Tr1 and second steering torque signal Tr2, for example) respectively.

This variation between the outputs of three-phase windings 18, 19 is defined as a variation caused by drive control of three-phase windings 18, 19 by first and second microprocessors 25, 26 based on output signals of different sensors, excluding a component of variation in output between three-phase windings 18, 19 caused by variation in gain therebetween.

The feature of the present embodiment that each of first steering torque signal Tr1 outputted via one output port of first sensor 11a and second steering torque signal Tr2 outputted via one output port of second sensor 11b is branched on resin substrate 21 into parallel signals and the parallel signals are transmitted respectively to first and second microprocessors 25, 26, serves to suppress increase of the number of output ports employed. This serves to allow torque sensor 11 to be made compact to have a small number of output ports for the present embodiment, and thereby allow the device to be made compact as a whole.

The further feature of the present embodiment that first and second microprocessors 25, 26 are provided with first and second abnormality detection parts 43, 63 respectively, makes it possible to identify first to fourth sensors 11a-11d as being abnormal or so, and perform failsafe operations and others based on its result, and thereby enhance the safety of the device.

According to the present embodiment, specific two of first to fourth steering torque signals Tr1-Tr4 outputted from first to fourth sensors 11a-11d are selected and compared about redundancy repeatedly to identify an abnormal one of the sensors. This manner of identification is simpler in logic than manners based on majority rule or the like. This serves to reduce the load of calculation of first and second microprocessors 25, 26.

The further feature of the present embodiment that when first sensor 11a is abnormal, first and second microprocessors 25, 26 respectively control driving of first and second three-phase windings 18, 19 based on second steering torque signals Tr2 received from second sensor 11b, serves to continue to produce the effect of suppressing variation between the outputs of first and second three-phase windings 18, 19.

Furthermore, according to the present embodiment, when one of first to fourth sensors 11a-11d is identified as being abnormal, abnormality detection about the remaining three sensors is continued based on the steering torque signals outputted from the remaining three sensors. This serves to continue accurate abnormality detection, and thereby further enhance the safety of the device.

The further feature of the present embodiment that first and second microprocessors 25, 26 are synchronized together by inter-processor communication, serves to enhance accuracy of cooperative control of first and second microprocessors 25, 26.

Specifically, the further feature of the present embodiment that first and second microprocessors 25, 26 are synchronized together, serves to allow abnormality of first to fourth sensors 11a-11d to be identified based on first to fourth steering torque signals Tr1-Tr4 acquired by simultaneous sensing, and thereby enhance the accuracy of the abnormality detection.

The further feature of the present embodiment that first and second microprocessors 25, 26 are synchronized together after the self-diagnosis function of each microprocessor 25, 26 is executed, serves to suppress deviation in synchronization timing and abnormality of inter-processor communication due to abnormality of first and second microprocessors 25, 26, and thereby enhance the reliability of the control system.

Second Embodiment

Figure 12:
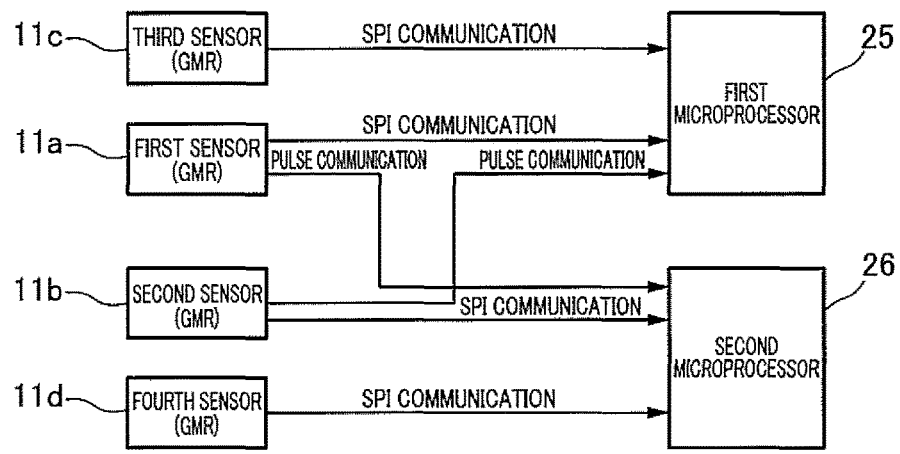
FIG. 12 is a schematic diagram showing a configuration of connection between torque sensors and first and second microprocessors according to a second embodiment of the present invention.

FIG. 12 shows a second embodiment of the present invention, which is configured basically as in the first embodiment, but is modified to differ from the first embodiment at least partially in system of communication between first to fourth sensors 11a-11d and first and second microprocessors 25, 26.

Specifically, according to the present embodiment, the system of communication between first sensor 11a and second microprocessor 26 and the system of communication between second sensor 11b and first microprocessor 25 are implemented by pulse communication as a second system of communication, instead of SPI communication.

In general, in view of general versatility, a microprocessor is provided with a small number of input ports per communication system, and does not allow a single communication system to employ a large number of input ports. Accordingly, if output signals of various sensors are to be inputted by a single communication system, the number of input ports of a microprocessor may be insufficient so that the microprocessor is required to be large-sized thereby increasing the cost.

In contrast, according to the present embodiment, the communication between first to fourth sensors 11a-11d and first and second microprocessors 25, 26 is implemented by the plurality of communication systems. This serves to implement each microprocessor 25, 26 by a compact microprocessor having a small number of input ports per communication system, and thereby suppress the cost from being increased.

In this configuration, when redundancy comparison is performed between two steering torque signals acquired by different communication systems, and the difference between the two steering torque signals is greater than or equal to the predetermined value, this result is not treated as a direct evidence for abnormality detection for torque sensor 11, but is treated merely as a reference, as in general.

Therefore, as shown in Table 3 below, in addition to the four patterns of redundancy comparison described above, another pattern such as redundancy comparison between third and fourth steering torque signals Tr3, Tr4 is performed to reinforce the basis for determination, and thereby maintain the accuracy of abnormality detection of torque sensor 11 high. In Table 3, each result of determination treated as a reference is indicated by a bracketed mark "(NG)".

TABLE 3

| | Redundancy Comparison | | | | |
| --- | --- | --- | --- | --- | --- |
| Abnormal Sensor | Between First and Second Sensors | Between First and Third Sensors | Between Second and Third Sensors | Between Second and Fourth Sensors | Between Third and Fourth Sensors |
| First Sensor Abnormal (Identified by First Microprocessor) | (NG) | NG | OK | OK | OK |
| Third Sensor Abnormal (Identified by First Microprocessor) | OK | NG | (NG) | OK | NG |
| Second Sensor Abnormal (Identified by Second Microprocessor) | (NG) | OK | (NG) | NG | OK |
| Fourth Sensor Abnormal (Identified by Second Microprocessor) | OK | OK | OK | NG | NG |

The other actions and effects are similar to those of the first embodiment.

Third Embodiment

Figure 13:
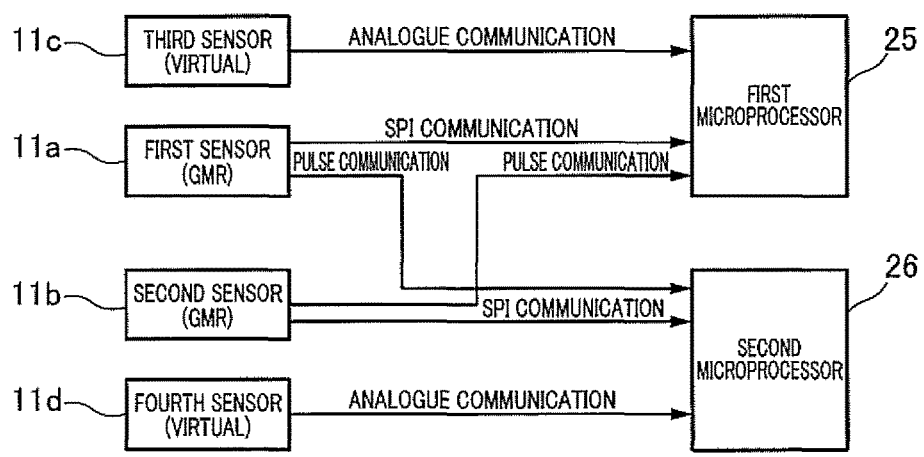
FIG. 13 is a schematic diagram showing a configuration of connection between torque sensors and first and second microprocessors according to a third embodiment of the present invention.

FIG. 13 shows a third embodiment of the present invention, which is configured basically as in the second embodiment, but is modified to differ from the second embodiment in that the communication between first to fourth sensors 11a-11d and first and second microprocessors 25, 26 is implemented by more different communication systems, and sensing of part of first to fourth sensors 11a-11d is implemented by a different sensing system.

Specifically, the system of communication between third sensor 11c and first microprocessor 25 and the system of communication between fourth sensor 11d and second microprocessor 26 are implemented by analogue communication as a third system of communication, instead of SPI communication.

Furthermore, according to the present embodiment, sensing of third and fourth sensors 11c, 11d is implemented by a so-called virtual system instead of the system employing the GMR element, wherein the virtual system is implemented by estimating the steering torque based on a state of energization of the sensor.

The configuration of the present embodiment that the communication between first to fourth sensors 11a-11d and first and second microprocessors 25, 26 is implemented by three communication systems, serves to allow first and second microprocessors 25, 26 to be made more compact to have a smaller number of input ports per communication system than the second embodiment, and thereby further suppress increase of the cost.

The further feature of the present embodiment that the sensing of the steering torque by first and second sensors 11a, 11b and the sensing of the steering torque by third and fourth sensors 11c, 11d are implemented by different sensing systems, serves to reduce the risk of simultaneous breakdowns of first to fourth sensors 11a-11d due to a common factor, as compared to a configuration that all of first to fourth sensors 11a-11d are implemented by a single sensing system.

The feature of the present embodiment that the sensing of the steering torque by first and second sensors 11a, 11b and the sensing of the steering torque by third and fourth sensors 11c, 11d are implemented by different sensing systems, may be modified as long as at least one of first to fourth sensors 11a-11d is implemented by a different manner than the remaining three sensors, for producing the advantageous effect described above.

The other actions and effects are similar to those of the first embodiment.

Fourth Embodiment

Figure 14:
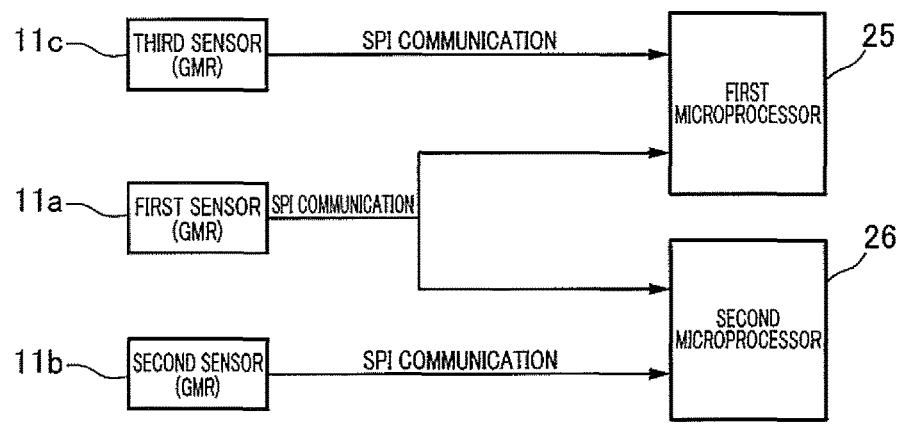
FIG. 14 is a schematic diagram showing a configuration of connection between torque sensors and first and second microprocessors according to a fourth embodiment of the present invention.

FIG. 14 shows a fourth embodiment of the present invention, which is configured basically as in the first embodiment, but is modified to differ from the first embodiment in that torque sensor 11 is composed of three sensors, namely, first to third sensors 11a-11c.

Specifically, according to the present embodiment, first sensor 11a is connected electrically to both of first and second microprocessors 25, 26 via respective signal lines, and second sensor 11b is connected electrically to only second microprocessor 26 via a signal line, and third sensor 11c is connected electrically to only first microprocessor 25 via a signal line.

Furthermore, according to the present embodiment, first and second microprocessors 25, 26 are configured to control driving of first and second three-phase windings 18, 19 based on first steering torque signals Tr1 received from first sensor 11a respectively, wherein the steering torque signal used for drive control of first and second three-phase windings 18, 19 is switched based on a result of diagnosis of first and second abnormality detection parts 43, 63.

More specifically, first abnormality detection part 43 is configured to acquire first and third steering torque signals Tr1, Tr3 from first and third sensors 11a, 11c, and acquire second steering torque signal Tr2 via inter-processor communication part 32 from second microprocessor 26, and thereafter perform redundancy comparison between first and second steering torque signals Tr1, Tr2 and redundancy comparison between first and third steering torque signals Tr1, Tr3.

Furthermore, as shown in Table 4 below, when the difference between first and second steering torque signals Tr1, Tr2 is greater than or equal to a predetermined value, and the difference between first and third steering torque signals Tr1, Tr3 is greater than or equal to the predetermined value, first abnormality detection part 43 then determines that first sensor 11a is abnormal. Based on this result of determination, first abnormality detection part 43 switches the steering torque signal, which is employed by first microprocessor 25 for drive control of first three-phase winding 18, from first steering torque signal Tr1 to third steering torque signal Tr3, and also switches the steering torque signal, which is employed by second microprocessor 26 for drive control of second three-phase winding 19, from first steering torque signal Tr1 to second steering torque signal Tr2. Thereafter, first abnormality detection part 43 continues to detect abnormality in second and third sensors 11b, 11c by redundancy comparison between second and third steering torque signals Tr2, Tr3 outputted by second and third sensors 11b, 11c.

On the other hand, as shown in Table 4 below, o10 when the difference between first and second steering torque signals Tr1, Tr2 is less than the predetermined value, and the difference between first and third steering torque signals Tr1, Tr3 is greater than or equal to the predetermined value, first abnormality detection part 43 then determines that third sensor 11c is abnormal. Thereafter, first abnormality detection part 43 continues to detect abnormality in first and second sensors 11a, 11b by redundancy comparison between first and second steering torque signals Tr1, Tr2 outputted by first and second sensors 11a, 11b.

Second abnormality detection part 63 is configured to acquire first and second steering torque signals Tr1, Tr2 from first and second sensors 11a, 11b, and acquire third steering torque signal Tr3 via inter-processor communication part 32 from first microprocessor 25, and thereafter perform redundancy comparison between first and second steering torque signals Tr1, Tr2 and redundancy comparison between first and third steering torque signals Tr1, Tr3.

As shown in Table 4 below, when the difference between first and second steering torque signals Tr1, Tr2 is greater than or equal to the predetermined value, and the difference between first and third steering torque signals Tr1, Tr3 is less than the predetermined value, second abnormality detection part 63 then determines that second sensor 11b is abnormal. Thereafter, second abnormality detection part 63 continues to detect abnormality in first and third sensors 11a, 11c by redundancy comparison between first and third steering torque signals Tr1, Tr3 outputted by first and third sensors 11a, 11c.

The abnormality determination about first sensor 11a based on redundancy comparison among first to third steering torque signals Tr1-Tr3 can be performed also by second abnormality detection part 63. Herein, detailed description thereof is omitted because it is similar to the abnormality determination about first sensor 11a by first abnormality detection part 43.

TABLE 4

| Abnormal Sensor | Redundancy Comparison | |
|---|---|---|
| | Between First and Second Sensors | Between First and Third Sensors |
| First Sensor Abnormal (Identified by First and Second Microprocessors) | NG | NG |
| Third Sensor Abnormal (Identified by First Microprocessor) | OK | NG |
| Second Sensor Abnormal (Identified by Second Microprocessor) | NG | OK |

According to the present embodiment, also in the thus-configured actuator and power steering device, both of first and second microprocessors 25, 26 control driving of first and second three-phase windings 18, 19 based on first steering torque signals Tr1 received from first sensor 11a, when first sensor 11a is normal. This feature serves to suppress variation between the outputs of first and second three-phase windings 18, 19.

The feature of the present embodiment that torque sensor 11 is composed of three sensors, namely, first to third sensors 11a-11c, allows to identify which one of first to third sensors 11a-11c is abnormal, by redundancy comparison among first to third steering torque signals Tr1-Tr3 outputted by first to third sensors 11a-11c.

This configuration serves to allow the steering assist control to be continued without immediate loss of the steering assist function even when one of first to third sensors 11a-11c is abnormal, because the drive control of first and second three-phase windings 18, 19 can be performed based on the remaining two normal sensors.

Fifth Embodiment

Figure 15:
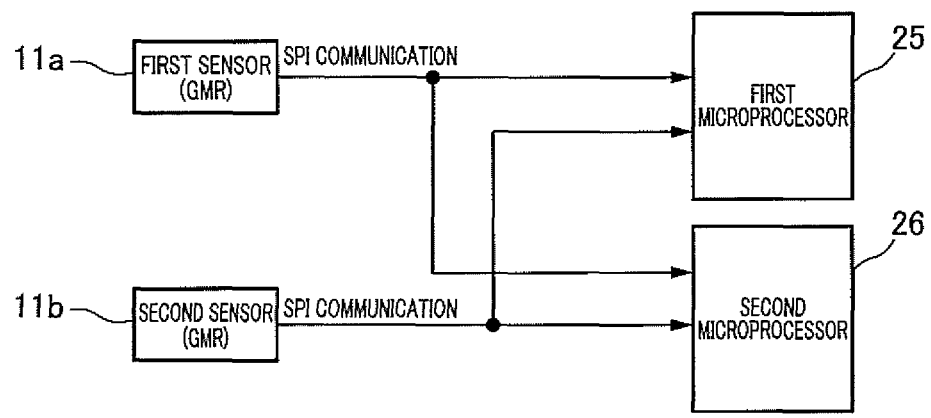
FIG. 15 is a schematic diagram showing a configuration of connection between torque sensors and first and second microprocessors according to a fifth embodiment of the present invention.

FIG. 15 shows a fifth embodiment of the present invention, which is configured basically as in the first embodiment, but is modified to differ from the first embodiment in that torque sensor 11 is composed of two sensors, namely, first and second sensors 11a, 11b, and the abnormality determination for first and second sensors 11a, 11b is implemented by redundancy comparison among first and second steering torque signals Tr1, Tr2 outputted from first and second sensors 11a, 11b and an alternative signal, wherein the alternative signal is acquired by estimation based on a state quantity of vehicle operation other than the steering torque.

Specifically, according to the present embodiment, as shown in FIG. 15, each of first and second sensors 11a, 11b is connected electrically to both of first and second microprocessors 25, 26 via respective signal lines.

Moreover, according to the present embodiment, first and second microprocessors 25, 26 are configured to control driving of first and second three-phase windings 18, 19 based on first steering torque signals Tr1 received from first sensor 11a respectively, wherein the steering torque signal used for drive control of first and second three-phase windings 18, 19 is switched based on a result of diagnosis of first and second abnormality detection parts 43, 63.

Figure 16:
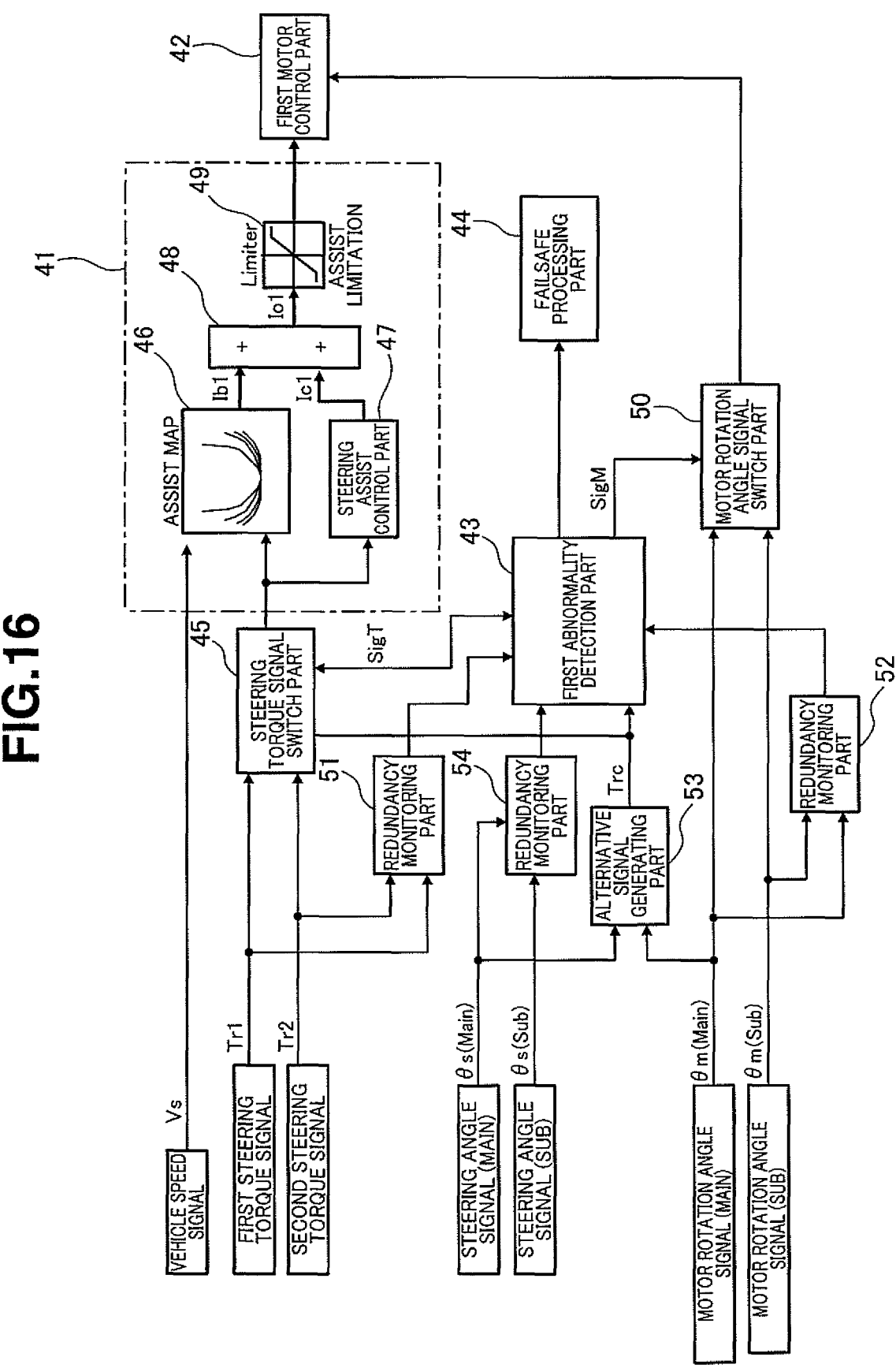
FIG. 16 is a control block diagram showing a configuration of processing of the first microprocessor according to the fifth embodiment.
Figure 17:
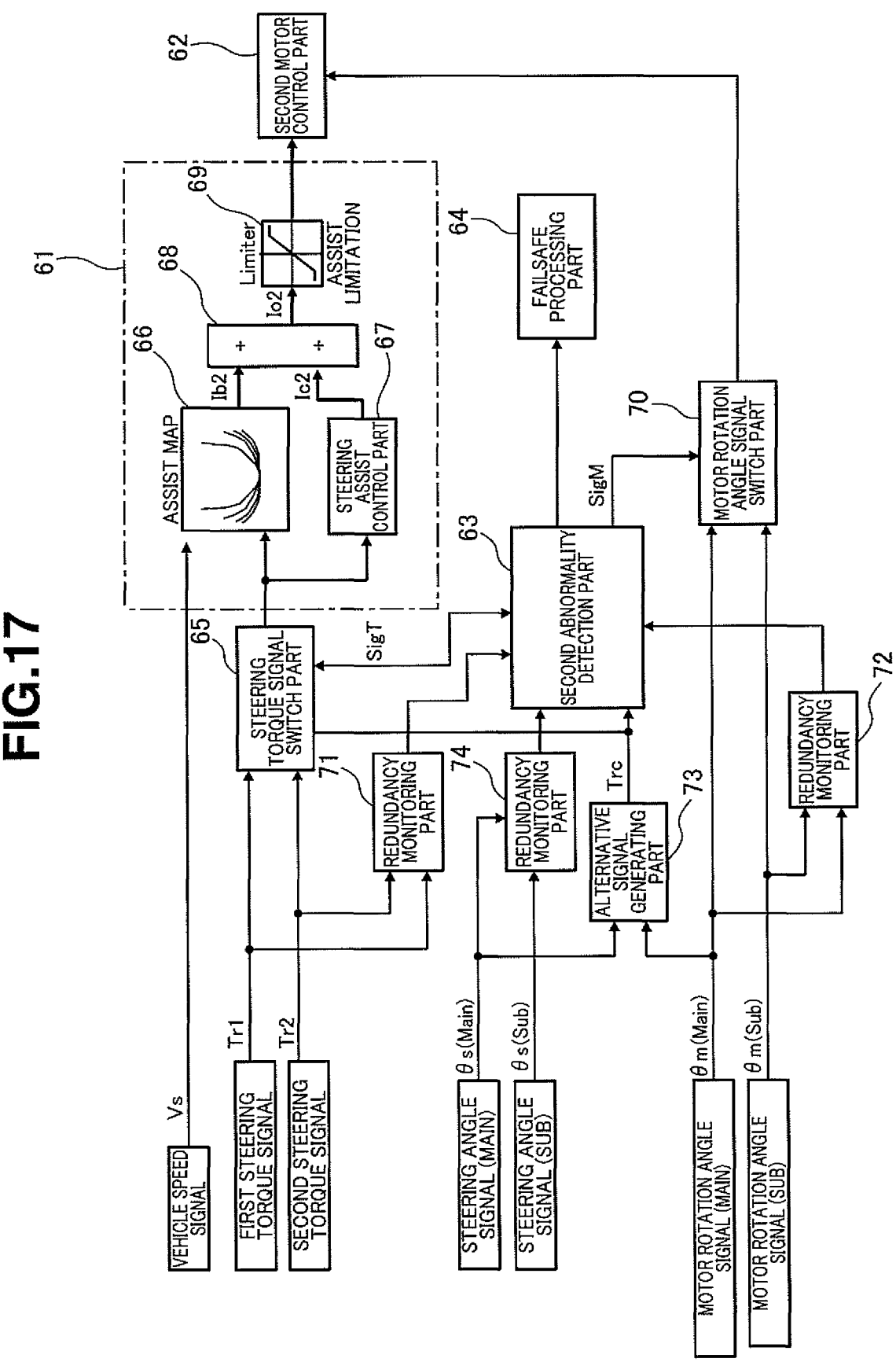
FIG. 17 is a control block diagram showing a configuration of processing of the second microprocessor according to the fifth embodiment.

Furthermore, as shown in FIGS. 16 and 17, first and second microprocessors 25, 26 according to the present embodiment respectively include first and second alternative signal generating parts 53, 73 for generating steering torque alternative signals Trc, in addition to the configuration according to the first embodiment.

First and second alternative signal generating parts 53, 73 are basically configured to operate similarly. Therefore, the following describes only first alternative signal generating part 53. Herein, description of second alternative signal generating part 73 is omitted.

First alternative signal generating part 53 is configured to receive input of main steering angle signal θs(Main) and main motor rotation angle signal θm(Main), and generate steering torque alternative signal Trc based on these inputted signals.

Figure 18:
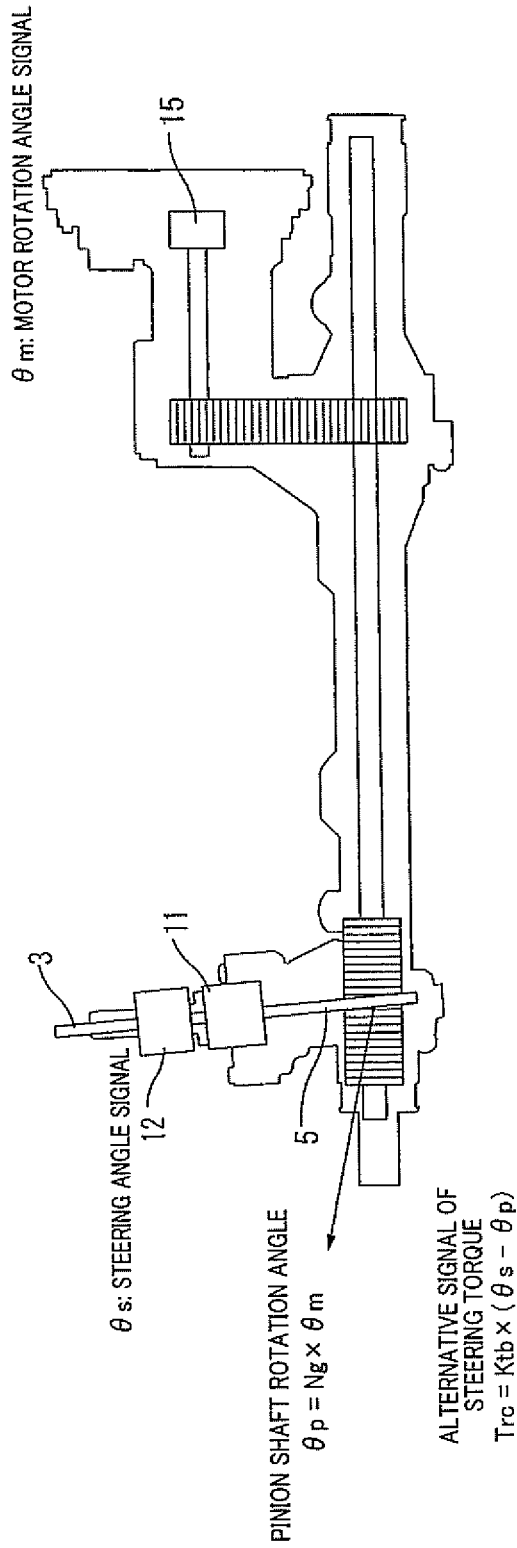
FIG. 18 is an illustrative diagram showing how an alternative signal of steering torque is calculated.

The following describes a method of calculation of steering torque alternative signal Trc with reference to FIG. 18.

This calculation of steering torque alternative signal Trc is implemented by multiplying a relative angle between an upstream side and a downstream side of the torsion bar by a torsional rigidity value Ktb. Herein, main steering angle signal θs(Main) is used as the angle of the upstream side of the torsion bar (i.e. the rotation angle of input shaft 3) is implemented by. On the other hand, as the angle of the downstream side of the torsion bar (i.e. the rotation angle of output shaft 5), an output shaft rotation angle signal θp is derived by multiplying the main motor rotation angle signal θm(Main) by a reduction ratio Ng between output shaft 5 and the drive shaft of electric motor 15. Namely, steering torque alternative signal Trc is calculated by using the following equation (1).

$$Trc = Ktb \times (\theta s - \theta p) \tag{1}$$

Figure 19:
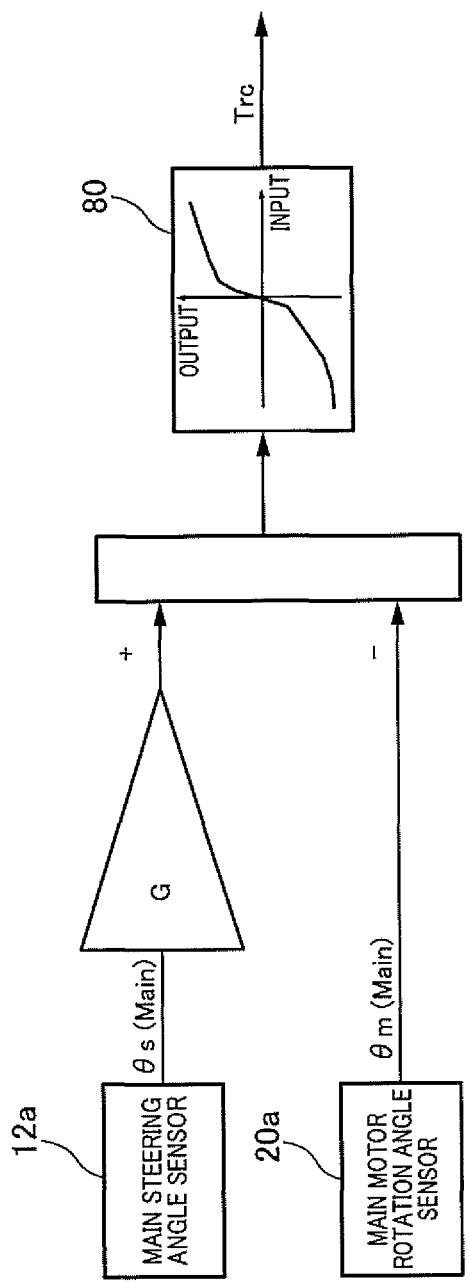
FIG. 19 is an illustrative diagram showing how an alternative signal of steering torque is generated according to a method different from that of FIG. 18.

The generation of steering torque alternative signal Trc by first alternative signal generating part 53 is not limited to the calculation described above, but may be implemented as shown in FIG. 19 by multiplying the main steering angle signal θs(Main) by a gain G to obtain a first quantity, and subtracting the main motor rotation angle signal θm(Main) from the first quantity to obtain a second quantity, and causing the second quantity to pass through a predetermined input-output map 80.

First abnormality detection part 43 is configured to acquire first and second steering torque signals Tr1, Tr2 from first and second sensors 11a, 11b, and acquire steering torque alternative signal Trc from first alternative signal generating part 53, and thereafter perform redundancy comparison between first and second steering torque signals Tr1, Tr2 and redundancy comparison between first steering torque signal Tr1 and steering torque alternative signal Trc, and redundancy comparison between second steering torque signal Tr2 and steering torque alternative signal Trc.

As shown in an upper row of Table 5 below, when the difference between first and second steering torque signals Tr1, Tr2 is greater than or equal to a predetermined value, and the difference between first steering torque signal Tr1 and steering torque alternative signal Trc is greater than or equal to the predetermined value, and the difference between second steering torque signal Tr2 and steering torque alternative signal Trc is less than the predetermined value, first abnormality detection part 43 then determines that first sensor 11a is abnormal. Based on this result of determination, first abnormality detection part 43 switches the steering torque signal, which is employed by first microprocessor 25 for drive control of first three-phase winding 18, from first steering torque signal Tr1 to second steering torque signal Tr2, and also switches the steering torque signal, which is employed by second microprocessor 26 for drive control of second three-phase winding 19, from first steering torque signal Tr1 to second steering torque signal Tr2. Thereafter, first abnormality detection part 43 continues to detect abnormality in second sensor 11b by redundancy comparison between steering torque alternative signal Trc and second steering torque signal Tr2 outputted by second sensor 11b.

On the other hand, second abnormality detection part 63 is configured to acquire first and second steering torque signals Tr1, Tr2 from first and second sensors 11a, 11b, and acquire steering torque alternative signal Trc from second alternative signal generating part 73, and thereafter perform redundancy comparison between first and second steering torque signals Tr1, Tr2 and redundancy comparison between first steering torque signal Tr1 and steering torque alternative signal Trc, and redundancy comparison between second steering torque signal Tr2 and steering torque alternative signal Trc.

As shown in a lower row of Table 5 below, when the difference between first and second steering torque signals Tr1, Tr2 is greater than or equal to a predetermined value, and the difference between first steering torque signal Tr1 and steering torque alternative signal Trc is less than the predetermined value, and the difference between second steering torque signal Tr2 and steering torque alternative signal Trc is greater than or equal to the predetermined value, second abnormality detection part 63 then determines that second sensor 11b is abnormal. Thereafter, second abnormality detection part 63 continues to detect abnormality in first sensor 11a by redundancy comparison between steering torque alternative signal Trc and first steering torque signal Tr1 outputted by first sensor 11a.

TABLE 5

| Abnormal Sensor | Redundancy Comparison | | |
|---|---|---|---|
| | Between First and Second Sensors | Between First Second and Alternative Signal | Between Second Second and Alternative Signal |
| First Sensor Abnormal (Identified by First and Second Microprocessors) | NG | NG | OK |
| Second Sensor Abnormal (Identified by First and Second Microprocessors) | NG | OK | NG |

First and second microprocessors 25, 26 include redundancy monitoring parts 54, 74 respectively for redundancy monitoring of main and auxiliary steering angle signals θs(Main), θs(Sub). Redundancy monitoring parts 54, 74 have similar functions as redundancy monitoring parts 51, 71 described above, except that the inputted signals are different. Herein, specific description thereof is omitted.

According to the present embodiment, also in the thus-configured actuator and power steering device, both of first and second microprocessors 25, 26 control driving of first and second three-phase windings 18, 19 based on first steering torque signals Tr1 received from first sensor 11a, when first sensor 11a is normal. This feature serves to suppress variation between the outputs of first and second three-phase windings 18, 19.

The feature of the present embodiment that first and second microprocessors 25, 26 include first and second alternative signal generating parts 53, 73 respectively, allows to identify which one of first and second sensors 11a, 11b is abnormal, by redundancy comparison among steering torque alternative signal Trc and first and second steering torque signals Tr1, Tr2 outputted by first and second sensors 11a, 11b, even with the configuration that torque sensor 11 is composed of first and second sensors 11a, 11b only.

This configuration serves to allow the steering assist control to be continued without immediate loss of the steering assist function even when one of first and second sensors 11a, 11b is abnormal, because the drive control of first and second three-phase windings 18, 19 can be performed based on the other normal sensor.

The further feature of the present embodiment that when first sensor 11a is abnormal, first and second microprocessors 25, 26 respectively control driving of first and second three-phase windings 18, 19 based on second steering torque signals Tr2 received from second sensor 11b, serves to continue to produce the effect of suppressing variation between the outputs of first and second three-phase windings 18, 19.

The feature of the present embodiment that first microprocessor 25 (i.e. first abnormality detection part 43) detects abnormality in first sensor 11a and second microprocessor 26 (i.e. second abnormality detection part 63) detects abnormality in second sensor 11b, may be modified such that abnormality of both of first and second sensors 11a, 11b is detected by only one of the microprocessors (i.e. its abnormality detection part).

The present invention is not limited to the configurations of the embodiments described above, but include modifications without going out of the substance of the present invention.

For example, the configuration of each embodiment that first and second three-phase windings 18, 19 as the first and second actuation parts are configured to drive the single electric motor 15 in cooperation with each other, may be modified such that the first and second actuation parts are configured to drive respective individual electric motors.

The vehicle-mounted device actuators and power steering device control devices according to the embodiments described above may be exemplified as follows.

According to one aspect, a vehicle-mounted device actuator includes: a first sensor structured to sense a specific state quantity of vehicle operation; a second sensor structured to sense the specific state quantity; a first actuation part structured to drive a vehicle-mounted device; a second actuation part structured to drive the vehicle-mounted device; a first microprocessor configured to receive an output signal from the first sensor, and control driving of the first actuation part based on the output signal received from the first sensor; and a second microprocessor configured to receive an output signal from the first sensor and an output signal from the second sensor, and control driving of the second actuation part based on the output signal received from the first sensor.

According to a preferable aspect, the vehicle-mounted device is configured such that the first sensor includes an output port through which the output signal received by the first microprocessor and the output signal received by the second microprocessor are outputted from the first sensor.

According to another preferable aspect, the vehicle-mounted device actuator according to one of the foregoing aspects is configured such that the second microprocessor includes an abnormality detection part configured to detect an abnormality in one of the first and second sensors by comparison between the output signal received from the first sensor and the output signal received from the second sensor.

According to a further preferable aspect, the vehicle-mounted device actuator according to one of the foregoing aspects further includes a third sensor structured to sense the specific state quantity, and output an output signal to one of the first microprocessor and the second microprocessor, wherein: the first microprocessor and the second microprocessor are connected to each other for informational communication therebetween; and the second microprocessor is configured to identify which one of the first, second, and third sensors is abnormal, by comparison among the output signals received from the first, second, and third sensors.

According to a further preferable aspect, the vehicle-mounted device actuator according to one of the foregoing aspects is configured such that one of the first microprocessor and the second microprocessor is configured to control driving of a corresponding one of the first actuation part and the second actuation part based on the output signal received from one of the first, second, and third sensors other than one of the first, second, and third sensors identified as being abnormal.

According to a further preferable aspect, the vehicle-mounted device actuator according to one of the foregoing aspects further includes a fourth sensor structured to sense the specific state quantity, and output an output signal to the second microprocessor, wherein: the second sensor is configured to output an output signal to the first microprocessor as for the second microprocessor; the third sensor is configured to output the output signal to the first microprocessor; the first microprocessor is configured to: when the first sensor is normal, control driving of the first actuation part based on the output signal received from the first sensor; and when the first sensor is abnormal, control driving of the first actuation part based on the output signal received from the second sensor; and the second microprocessor is configured to: when the first sensor is normal, control driving of the second actuation part based on the output signal received from the first sensor; and when the first sensor is abnormal, control driving of the second actuation part based on the output signal received from the second sensor.

According to a further preferable aspect, the vehicle-mounted device actuator according to one of the foregoing aspects is configured such that each of the first microprocessor and the second microprocessor is configured to: when one of the first, second, third, and fourth sensors is identified as being abnormal, continue to detect an abnormality in three of the first, second, third, and fourth sensors other than the one of the first, second, third, and fourth sensors identified as being abnormal, by comparison among the output signals received from the three of the first, second, third, and fourth sensors.

According to a further preferable aspect, the vehicle-mounted device actuator according to one of the foregoing aspects is configured such that at least one of the first, second, third, and fourth sensors is structured to implement its sensing by a different manner than another one of the first, second, third, and fourth sensors.

According to a further preferable aspect, the vehicle-mounted device actuator according to one of the foregoing aspects is configured such that the first microprocessor and the second microprocessor are configured to be synchronized together by communication therebetween.

According to a further preferable aspect, the vehicle-mounted device actuator according to one of the foregoing aspects is configured such that the second microprocessor is configured to detect an abnormality in one of the first sensor and the second sensor by comparison between the output signal of the first sensor and the output signal of the second sensor that are acquired by sensing simultaneously.

According to a further preferable aspect, the vehicle-mounted device actuator according to one of the foregoing aspects is configured such that: each of the first microprocessor and the second microprocessor has a function of self-diagnosis to diagnose whether or not the each of the first microprocessor and the second microprocessor is abnormal; and the first microprocessor and the second microprocessor are configured to be synchronized together by communication therebetween after execution of the function of self-diagnosis.

According to a further preferable aspect, the vehicle-mounted device actuator according to one of the foregoing aspects is configured such that the output signal outputted from the first sensor to the first microprocessor is conveyed in a different manner of communication than the output signal outputted from the first sensor to the second microprocessor.

According to another aspect, a vehicle-mounted device actuator includes: a first sensor structured to sense a specific state quantity of vehicle operation; a second sensor structured to sense the specific state quantity; a first actuation part structured to drive a vehicle-mounted device; a second actuation part structured to drive the vehicle-mounted device; a first microprocessor configured to control driving of the first actuation part; a second microprocessor configured to control driving of the second actuation part; a signal line connecting the first sensor to the first microprocessor; a signal line connecting the first sensor to the second microprocessor; and a signal line connecting the second sensor to the second microprocessor.

According to one aspect, a power steering device includes: a steering mechanism structured to steer a steerable wheel in accordance with steering of a steering wheel; a first sensor structured to sense a specific state quantity of steering; a second sensor structured to sense the specific state quantity; a first actuation part structured to apply a steering force to the steering mechanism; a second actuation part structured to apply a steering force to the steering mechanism; a first microprocessor configured to receive an output signal from the first sensor, and control driving of the first actuation part based on the output signal received from the first sensor; and a second microprocessor configured to receive an output signal from the first sensor and an output signal from the second sensor, and control driving of the second actuation part based on the output signal received from the first sensor.

According to a preferable aspect, the power steering device is configured such that the first sensor includes an output port through which the output signal received by the first microprocessor and the output signal received by the second microprocessor are outputted from the first sensor.

According to another preferable aspect, the power steering device according to one of the foregoing aspects is configured such that the second microprocessor includes an abnormality detection part configured to detect an abnormality in one of the first and second sensors by comparison between the output signal received from the first sensor and the output signal received from the second sensor.

According to a further preferable aspect, the power steering device according to one of the foregoing aspects further includes a third sensor structured to sense the specific state quantity, and output an output signal to one of the first microprocessor and the second microprocessor, wherein: the first microprocessor and the second microprocessor are connected to each other for informational communication therebetween; and the second microprocessor is configured to identify which one of the first, second, and third sensors is abnormal, by comparison among the output signals received from the first, second, and third sensors.

According to a further preferable aspect, the power steering device according to one of the foregoing aspects further includes a fourth sensor structured to sense the specific state quantity, and output an output signal to the second microprocessor, wherein: the second sensor is configured to output an output signal to the first microprocessor as for the second microprocessor; the third sensor is configured to output the output signal to the first microprocessor; the first microprocessor is configured to: when the first sensor is normal, control driving of the first actuation part based on the output signal received from the first sensor; and when the first sensor is abnormal, control driving of the first actuation part based on the output signal received from the second sensor; and the second microprocessor is configured to: when the first sensor is normal, control driving of the second actuation part based on the output signal received from the first sensor; and when the first sensor is abnormal, control driving of the second actuation part based on the output signal received from the second sensor.

According to a further preferable aspect, the power steering device according to one of the foregoing aspects is configured such that the first microprocessor and the second microprocessor are configured to be synchronized together by communication therebetween.

According to a further preferable aspect, the power steering device according to one of the foregoing aspects is configured such that the second microprocessor is configured to detect an abnormality in one of the first sensor and the second sensor by comparison between the output signal of the first sensor and the output signal of the second sensor that are acquired by sensing simultaneously.

The invention claimed is:

1. A vehicle-mounted device actuator comprising:
   a first sensor structured to sense a specific state quantity of vehicle operation;
   a second sensor structured to sense the specific state quantity;
   a first actuation part structured to drive a vehicle-mounted device;
   a second actuation part structured to drive the vehicle-mounted device;
   a first microprocessor configured to receive an output signal from the first sensor, and control driving of the first actuation part based on the output signal received from the first sensor; and
   a second microprocessor configured to receive an output signal from the first sensor and an output signal from the second sensor, and control driving of the second actuation part based on the output signal received from the first sensor,
   wherein the output signal outputted from the first sensor to the first microprocessor is conveyed in a different manner of communication than the output signal outputted from the first sensor to the second microprocessor.

2. The vehicle-mounted device actuator according to claim 1, wherein the first sensor includes an output port through which the output signal received by the first microprocessor and the output signal received by the second microprocessor are outputted from the first sensor.

3. The vehicle-mounted device actuator according to claim 2, wherein the second microprocessor includes an abnormality detection part configured to detect an abnormality in one of the first and second sensors by comparison between the output signal received from the first sensor and the output signal received from the second sensor.

4. The vehicle-mounted device actuator according to claim 3, further comprising a third sensor structured to sense the specific state quantity, and output an output signal to one of the first microprocessor and the second microprocessor, wherein:
   the first microprocessor and the second microprocessor are connected to each other for informational communication therebetween; and
   the second microprocessor is configured to identify which one of the first, second, and third sensors is abnormal, by comparison among the output signals received from the first, second, and third sensors.

5. The vehicle-mounted device actuator according to claim 4, wherein one of the first microprocessor and the second microprocessor is configured to control driving of a corresponding one of the first actuation part and the second actuation part based on the output signal received from one of the first, second, and third sensors other than one of the first, second, and third sensors identified as being abnormal.

6. The vehicle-mounted device actuator according to claim 4, further comprising a fourth sensor structured to sense the specific state quantity, and output an output signal to the second microprocessor, wherein:
   the second sensor is configured to output an output signal to the first microprocessor as for the second microprocessor;
   the third sensor is configured to output the output signal to the first microprocessor;
   the first microprocessor is configured to:
      when the first sensor is normal, control driving of the first actuation part based on the output signal received from the first sensor; and
      when the first sensor is abnormal, control driving of the first actuation part based on the output signal received from the second sensor; and
   the second microprocessor is configured to:
      when the first sensor is normal, control driving of the second actuation part based on the output signal received from the first sensor; and
      when the first sensor is abnormal, control driving of the second actuation part based on the output signal received from the second sensor.

7. The vehicle-mounted device actuator according to claim 6, wherein each of the first microprocessor and the second microprocessor is configured to:
   when one of the first, second, third, and fourth sensors is identified as being abnormal,
   continue to detect an abnormality in three of the first, second, third, and fourth sensors other than the one of the first, second, third, and fourth sensors identified as being abnormal, by comparison among the output signals received from the three of the first, second, third, and fourth sensors.

8. The vehicle-mounted device actuator according to claim 6, wherein at least one of the first, second, third, and fourth sensors is structured to implement its sensing by a different manner than another one of the first, second, third, and fourth sensors.

9. The vehicle-mounted device actuator according to claim 1, wherein the first microprocessor and the second microprocessor are configured to be synchronized together by communication therebetween.

10. The vehicle-mounted device actuator according to claim 9, wherein the second microprocessor is configured to detect an abnormality in one of the first sensor and the second sensor by comparison between the output signal of the first sensor and the output signal of the second sensor that are acquired by sensing simultaneously.

11. The vehicle-mounted device actuator according to claim 9, wherein:
each of the first microprocessor and the second microprocessor has a function of self-diagnosis to diagnose whether or not the each of the first microprocessor and the second microprocessor is abnormal; and
the first microprocessor and the second microprocessor are configured to be synchronized together by communication therebetween after execution of the function of self-diagnosis.

12. A power steering device comprising:
a steering mechanism structured to steer a steerable wheel in accordance with steering of a steering wheel;
a first sensor structured to sense a specific state quantity of steering;
a second sensor structured to sense the specific state quantity;
a first actuation part structured to apply a steering force to the steering mechanism;
a second actuation part structured to apply a steering force to the steering mechanism;
a first microprocessor configured to receive an output signal from the first sensor, and control driving of the first actuation part based on the output signal received from the first sensor; and
a second microprocessor configured to receive an output signal from the first sensor and an output signal from the second sensor, and control driving of the second actuation part based on the output signal received from the first sensor,
wherein the output signal outputted from the first sensor to the first microprocessor is conveyed in a different manner of communication than the output signal outputted from the first sensor to the second microprocessor.

13. A vehicle-mounted device actuator comprising:
a first sensor structured to sense a specific state quantity of vehicle operation;
a second sensor structured to sense the specific state quantity;
a first actuation part structured to drive a vehicle-mounted device;
a second actuation part structured to drive the vehicle-mounted device;
a first microprocessor configured to control driving of the first actuation part;
a second microprocessor configured to control driving of the second actuation part;
a signal line connecting the first sensor to the first microprocessor;
a signal line connecting the first sensor to the second microprocessor; and
a signal line connecting the second sensor to the second microprocessor,
wherein an output signal outputted from the first sensor to the first microprocessor is conveyed in a different manner of communication than an output signal outputted from the first sensor to the second microprocessor.

* * * * *